US012677213B2

(12) United States Patent
Zhu et al.

(10) Patent No.: US 12,677,213 B2
(45) Date of Patent: Jul. 7, 2026

(54) TRACKING AREA SELECTION METHOD, DEVICE, AND SYSTEM

(71) Applicant: HUAWEI TECHNOLOGIES CO., LTD., Shenzhen (CN)

(72) Inventors: Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 18/433,089

(22) Filed: Feb. 5, 2024

(65) Prior Publication Data

US 2024/0179618 A1 May 30, 2024

Related U.S. Application Data

(63) Continuation of application No. PCT/CN2022/097472, filed on Jun. 7, 2022.

(30) Foreign Application Priority Data

Aug. 6, 2021 (CN) ........................ 202110904289.X

(51) Int. Cl.
*H04W 48/18* (2009.01)
*H04W 12/06* (2021.01)
(Continued)

(52) U.S. Cl.
CPC ........... *H04W 48/18* (2013.01); *H04W 12/06* (2013.01); *H04W 48/02* (2013.01); *H04W 60/04* (2013.01)

(58) Field of Classification Search
None
See application file for complete search history.

(56) References Cited

U.S. PATENT DOCUMENTS

2021/0250890 A1* 8/2021 Won ...................... H04W 60/04
2022/0232507 A1* 7/2022 Kim ...................... H04W 60/04
(Continued)

FOREIGN PATENT DOCUMENTS

CN 113039825 A 6/2021
EP 3573375 A1 11/2019
(Continued)

OTHER PUBLICATIONS

"3rd Generation Partnership Project; Technical Specification Group Services and System Aspects; System architecture for the 5G System (5GS); Stage 2 (Release 17)," 3GPP TS 23.501 V17.1.1, total 526 pages, 3rd Generation Partnership Project, Valbonne, France (Jun. 2021).

(Continued)

*Primary Examiner* — Faiyazkhan Ghafoerkhan
(74) *Attorney, Agent, or Firm* — Leydig, Voit & Mayer, Ltd.

(57) ABSTRACT

A tracking area selection method, a device, and a system are provided. The method includes: a mobility management network element initiates an authentication and authorization procedure for a network slice on which authentication and authorization are to be performed and that is in a network slice requested by a terminal; determines, based on a result of the authentication and authorization procedure, identification information of a network slice that the terminal is allowed to access; obtains, based on first information and the identification information of the network slice that the terminal is allowed to access, identification information of a target network slice and radio resource information corresponding to the target network slice; and sends the identification information of the target network slice and the radio resource information corresponding to the target network slice to an access network device.

20 Claims, 12 Drawing Sheets

(51) Int. Cl.
    *H04W 48/02*       (2009.01)
    *H04W 60/04*       (2009.01)

(56)         References Cited

U.S. PATENT DOCUMENTS

| | | | | |
|---|---|---|---|---|
| 2022/0240174 | A1* | 7/2022 | Kim | H04W 4/50 |
| 2022/0377693 | A1* | 11/2022 | Sugawara | H04W 76/10 |
| 2022/0386120 | A1* | 12/2022 | Kim | H04L 63/0892 |
| 2023/0022888 | A1* | 1/2023 | Kim | H04W 60/04 |
| 2023/0053127 | A1* | 2/2023 | Sugawara | H04W 24/04 |
| 2023/0067830 | A1* | 3/2023 | Tiwari | H04W 48/12 |
| 2023/0115813 | A1* | 4/2023 | Sugawara | H04W 60/00 |
| | | | | 455/435.2 |
| 2023/0262637 | A1* | 8/2023 | Sugawara | H04W 8/18 |
| | | | | 455/435.1 |
| 2023/0371125 | A1* | 11/2023 | Park | H04W 48/18 |
| 2023/0397092 | A1* | 12/2023 | Kim | H04W 48/16 |
| 2024/0031925 | A1* | 1/2024 | Tiwari | H04W 60/04 |
| 2024/0107481 | A1* | 3/2024 | Tiwari | H04W 76/15 |
| 2024/0179618 | A1* | 5/2024 | Zhu | H04W 48/18 |

FOREIGN PATENT DOCUMENTS

| | | | |
|---|---|---|---|
| WO | 2021004444 | A1 | 1/2021 |
| WO | 2021015200 | A1 | 1/2021 |

OTHER PUBLICATIONS

"3rd Generation Partnership Project; Technical Specification Group Services and System Aspects; Procedures for the 5G System (5GS); Stage 2 (Release 17)," 3GPP TS 23.502 V17.1.0, total 693 pages, 3rd Generation Partnership Project, Valbonne, France (Jun. 2021).

"3rd Generation Partnership Project; Technical Specification Group Services and System Aspects; Study on enhancement of network slicing; Phase 2 (Release 17)," 3GPP TR 23.700-40 V17.0.0, total 224 pages, XP052000258, 3GPP—3rd Generation Partnership Project, Valbonne, France (Mar. 2021).

"3rd Generation Partnership Project; Technical Specification Group Services and System Aspects; Security Aspects; Study on Security Aspects of Enhanced Network Slicing (Release 16)," 3GPP TR 33.813 V0.8.0, total 38 pages, 3GPP—3rd Generation Partnership Project, Valbonne, France (Nov. 2019).

"Network Slice restriction based on NWDAF analytics," SA WG2 Meeting #143E e-meeting, Elbonia, S2-2102075, total 12 pages, 3GPP—3rd Generation Partnership Project, Valbonne, France (Feb. 24-Mar. 9, 2021).

* cited by examiner

Network slice selection network element

Data management network element

Policy control network element

Mobility management network element

Terminal 1

Terminal 2

Terminal 3

Access network device

Network slice

Network slice

Network slice

Authentication and authorization network element

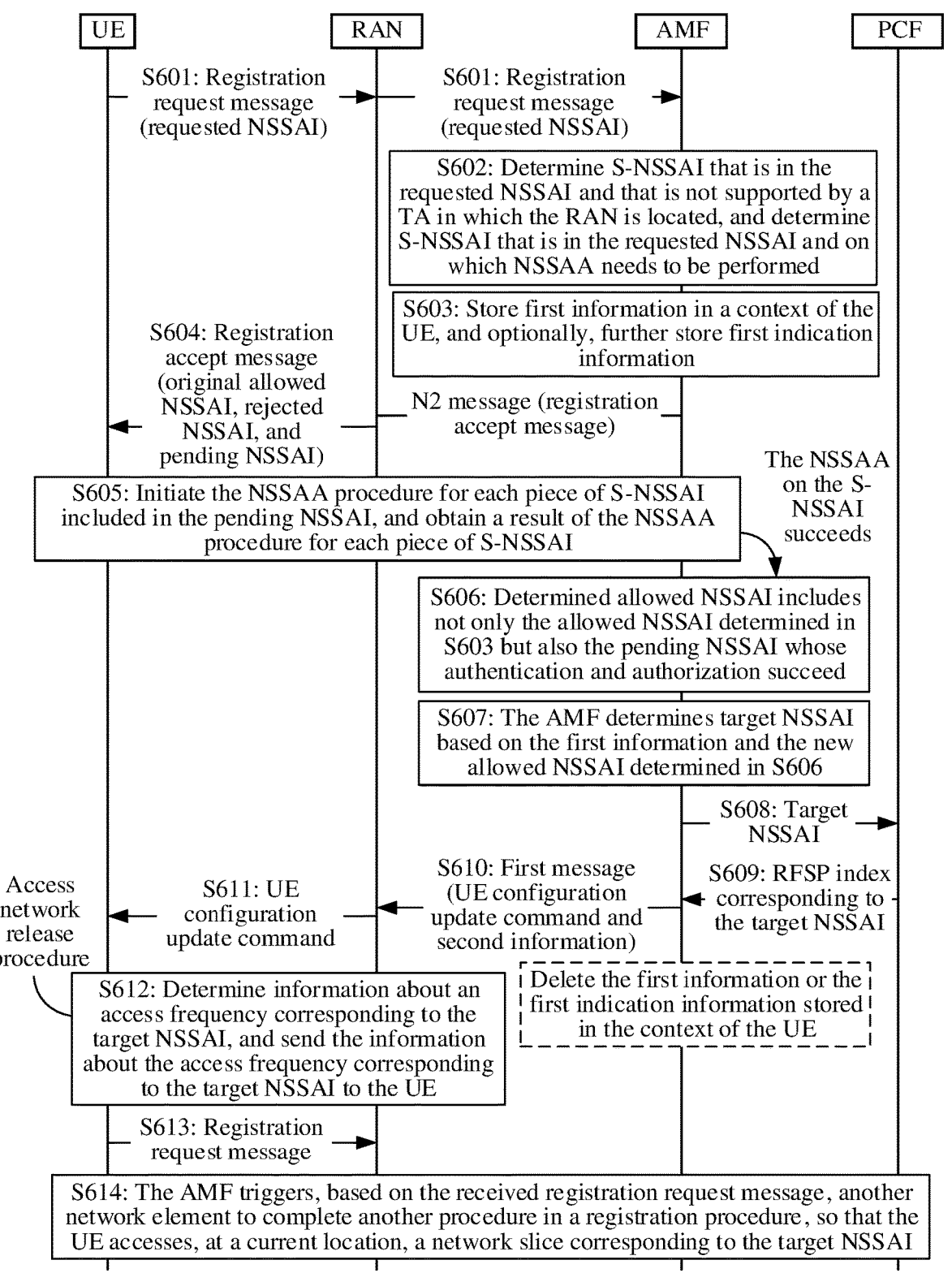

| UE | RAN | AMF | PCF |
| --- | --- | --- | --- |

S601: Registration request message (requested NSSAI)

S601: Registration request message (requested NSSAI)

S602: Determine S-NSSAI that is in the requested NSSAI and that is not supported by a TA in which the RAN is located, and determine S-NSSAI that is in the requested NSSAI and on which NSSAA needs to be performed S603: Store first information in a context of the UE, and optionally, further store first indication information S604: Registration accept message (original allowed NSSAI, rejected NSSAI, and pending NSSAI)

N2 message (registration accept message)

The NSSAA on the S-NSSAI succeeds

S605: Initiate the NSSAA procedure for each piece of S-NSSAI included in the pending NSSAI, and obtain a result of the NSSAA procedure for each piece of S-NSSAI S606: Determined allowed NSSAI includes not only the allowed NSSAI determined in S603 but also the pending NSSAI whose authentication and authorization succeed S607: The AMF determines target NSSAI based on the first information and the new allowed NSSAI determined in S606

S608: Target NSSAI

Access network release procedure

S611: UE configuration update command

S610: First message (UE configuration update command and second information)

S609: RFSP index corresponding to the target NSSAI

Delete the first information or the first indication information stored in the context of the UE S612: Determine information about an access frequency corresponding to the target NSSAI, and send the information about the access frequency corresponding to the target NSSAI to the UE S613: Registration request message S614: The AMF triggers, based on the received registration request message, another network element to complete another procedure in a registration procedure, so that the UE accesses, at a current location, a network slice corresponding to the target NSSAI

FIG. 6

TRACKING AREA SELECTION METHOD, DEVICE, AND SYSTEM

CROSS-REFERENCE TO RELATED APPLICATIONS

This application is a continuation of International Application No. PCT/CN2022/097472, filed on Jun. 7, 2022, which claims priority to Chinese Application No. 202110904289.X, filed on Aug. 6, 2021. The disclosures of the aforementioned applications are hereby incorporated by reference in their entireties.

TECHNICAL FIELD

Embodiments of this application relate to the field of communication technologies, and in particular, to a tracking area selection method, a device, and a system.

BACKGROUND

Network slicing (NS) is for supporting logically isolated networks having specific network capabilities and network features, and is a key technology for meeting a network differentiation requirement in 5th generation (5G) mobile communication technologies proposed by the 3rd generation partnership project (3GPP). The network slicing can provide mutually isolated network environments for different application scenarios by virtualizing independent logical networks on a same network infrastructure, so that network functions and features can be customized for the different application scenarios depending on respective requirements, to truly ensure quality of service (QOS) requirements of different services.

When a terminal requests to access a network slice, because the terminal blindly selects an access network device, a radio resource deployed in a tracking area (TA) in which the access network device is located may not support the network slice that the terminal requests to access. Consequently, the network slice fails to be accessed. How to select an appropriate TA to ensure that the terminal successfully accesses the network slice through the TA becomes a problem to be urgently resolved.

SUMMARY

Embodiments of this application provide a tracking area selection method, a device, and a system, to resolve a problem of a failure in accessing a network slice by a terminal.

To achieve the foregoing objective, the following technical solutions are applied in embodiments of this application.

According to a first aspect, a tracking area selection method is provided. The method includes: A mobility management network element initiates an authentication and authorization procedure for a network slice on which authentication and authorization are to be performed and that is in a network slice requested by a terminal; determines, based on a result of the authentication and authorization procedure for the network slice, identification information of a network slice that the terminal is allowed to access; obtains, based on first information and the identification information of the network slice that the terminal is allowed to access, identification information of a target network slice and radio resource information corresponding to the target network slice; and sends the identification information of the target network slice and the radio resource information corresponding to the target network slice to an access network device, so that the access network device can successfully connect, based on the identification information of the target network slice and the radio resource information corresponding to the target network slice, the terminal to a network slice supported by a new TA. The first information includes identification information of a network slice that the terminal is rejected to access or identification information of the network slice requested by the terminal, and the network slice that the terminal is rejected to access is a network slice that is not supported by a TA in which the access network device is located and that is in the network slice requested by the terminal.

According to the method in the first aspect, in a scenario in which the network slice on which authentication and authorization are to be performed exists, the identification information of the target network slice may be determined based on the authentication and authorization result after the authentication and authorization are performed on the network slice, to ensure accuracy of the determined network slice that the terminal is allowed to access. In addition, the access network device is notified to select, for the terminal, the new TA that supports the target network slice, to resolve a problem, in a conventional technology, of a failure in accessing a network slice by a terminal.

In a possible design, the mobility management network element obtains second information in any one of the following manners based on the first information and the identification information of the network slice that the terminal is allowed to access: The mobility management network element determines the second information based on the first information and the identification information of the network slice that the terminal is allowed to access. For example, the mobility management network element may determine, based on the first information, the identification information of the network slice that the terminal is rejected to access, determine the identification information of the target network slice based on the identification information of the network slice that the terminal is rejected to access and the identification information of the network slice that the terminal is allowed to access, and receive the radio resource information corresponding to the target network slice from a policy control network element. Alternatively, the mobility management network element sends, to a network slice selection function network element, the first information and the identification information of the network slice that the terminal is allowed to access, and receives the second information from the network slice selection function network element.

According to this possible design, the second information may be determined by the mobility management network element, or may be determined by another network element, to flexibly and effectively obtain the second information.

In a possible design, the mobility management network element may send the second information to the access network device after a registration procedure for the terminal. In this way, a network side may be notified, after the terminal completes registration and establishes a connection to the network side, to select the new TA for the terminal, to ensure that a procedure subsequent to the network registration is successfully performed.

In a possible design, the mobility management network element sends the second information to the access network device in any one of the following manners: Manner 1: If the authentication and authorization procedure for the network slice on which authentication and authorization are to be performed succeeds, the mobility management network element initiates a user equipment (UE) configuration update procedure, and sends, to the access network device, a first message including a UE configuration update command and the first information. In other words, in a scenario in which the authentication and authorization succeed, the second information is sent to the access network device through the UE configuration update procedure, to reduce signaling overheads. Manner 2: If the authentication and authorization procedure for the network slice on which authentication and authorization are to be performed is unsuccessful, and the identification information of the network slice that the terminal is allowed to access is not empty, the mobility management network element sends a UE context modification request carrying the second information to the access network device. Manner 3: If the authentication and authorization procedure for the network slice on which authentication and authorization are to be performed is unsuccessful, and the identification information of the network slice that the terminal is allowed to access is empty, the mobility management network element sends a UE context release request carrying the second information to the access network device.

According to this possible design, the second information may be sent in different manners based on different application scenarios, to ensure that the second information is flexibly and effectively sent to the access network device, and simplify a system design.

In a possible design, the method further includes: The mobility management network element stores the first information. To be specific, the first information is pre-stored, so that the second information is obtained based on the stored first information and other information (for example, the identification information of the network slice that the terminal is allowed to access) after the authentication and authorization procedure ends. In other words, a delay in and complexity of obtaining the second information are reduced by pre-storing the first information, to simplify the system design.

In a possible design, the method further includes: The mobility management network element stores first indication information, where the first indication information indicates to perform one or more of the following: selecting a new tracking area for the terminal, where the new tracking area supports the target network slice; redirecting the terminal to a tracking area or a frequency band that supports the target network slice; or obtaining the second information after the authentication and authorization procedure, so that the mobility management network element obtains the second information in response to the first indication information after the authentication and authorization procedure ends, to determine, with reference to the authentication and authorization result, the identification information of the network slice that the terminal is allowed to access, and therefore ensure accuracy of the identification information that is of the target network slice and that is determined based on the first information and the identification information of the network slice that the terminal is allowed to access.

In a possible design, when determining that the network slice not supported by the TA in which the access network device is located exists in the network slice requested by the terminal (or the new TA needs to be selected), the mobility management network element may determine that the first information is needed for subsequently determining the identification information of the target network slice. In this case, the first information is stored, or further optionally, the first indication information is stored.

In a possible design, the method further includes: The mobility management network element may delete the stored first information or first indication information after obtaining the second information, to reduce local cache pressure of the mobility management network element.

According to a second aspect, a communication apparatus is provided to implement the foregoing method. The communication apparatus may be the mobility management network element in the first aspect or an apparatus including the mobility management network element. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions. For example, in a possible design, the communication apparatus may include a processing unit and a transceiver unit.

The processing unit is configured to: obtain, from identification information of a network slice requested by a terminal, identification information of a network slice on which authentication and authorization are to be performed; initiate an authentication and authorization procedure for the network slice on which authentication and authorization are to be performed; determine, based on a result of the authentication and authorization procedure for the network slice, identification information of a network slice that the terminal is allowed to access; and obtain second information based on first information and the identification information of the network slice that the terminal is allowed to access, where the first information includes identification information of a network slice that the terminal is rejected to access or the identification information of the network slice requested by the terminal, and the network slice that the terminal is rejected to access is a network slice that is not supported by a TA in which an access network device is located and that is in the network slice requested by the terminal.

The transceiver unit is configured to send the second information to the access network device. The second information includes identification information of a target network slice and radio resource information corresponding to the target network slice.

According to a third aspect, a communication apparatus is provided, including a processor and a memory. The memory is configured to store computer instructions. When the processor executes the instructions, the communication apparatus is enabled to perform the method according to any one of the foregoing aspects. The communication apparatus may be the mobility management network element in the first aspect or an apparatus including the mobility management network element.

According to a fourth aspect, a communication apparatus is provided, including a processor. The processor is configured to: be coupled to a memory, and perform, after reading instructions in the memory, the method in any one of the foregoing aspects according to the instructions. The communication apparatus may be the mobility management network element in the first aspect or an apparatus including the mobility management network element.

According to a fifth aspect, a computer-readable storage medium is provided. The computer-readable storage medium stores instructions. When the instructions are run on a computer, the computer is enabled to perform the method according to any one of the foregoing aspects.

According to a sixth aspect, a computer program product including instructions is provided. When the computer program product runs on a computer, the computer is enabled to perform the method according to any one of the foregoing aspects.

According to a seventh aspect, a communication apparatus (where for example, the communication apparatus may be a chip or a chip system) is provided. The communication apparatus includes a processor, configured to implement functions in any one of the foregoing aspects. In a possible design, the communication apparatus further includes a memory, where the memory is configured to store necessary program instructions and data. When the communication apparatus is the chip system, the chip system may include a chip, or include a chip and another discrete component.

For technical effects brought by any design manner of the second aspect to the seventh aspect, refer to the technical effects brought by different design manners of the first aspect. Details are not described herein again.

According to an eighth aspect, a communication system is provided. The communication system includes a mobility management network element and an access network device. The mobility management network element is configured to: obtain, from identification information of a network slice requested by a terminal, identification information of a network slice on which authentication and authorization are to be performed; initiate an authentication and authorization procedure for the network slice on which authentication and authorization are to be performed; determine, based on a result of the authentication and authorization procedure for the network slice, identification information of a network slice that the terminal is allowed to access; obtain second information based on first information and the identification information of the network slice that the terminal is allowed to access; and send the second information to the access network device, where the first information includes identification information of a network slice that the terminal is rejected to access or the identification information of the network slice requested by the terminal, and the network slice that the terminal is rejected to access is a network slice that is not supported by a TA in which the access network device is located and that is in the network slice requested by the terminal. The access network device is configured to: receive the second information, and select a new TA for the terminal based on the second information, so that the terminal successfully accesses, through the new TA, a network slice supported by the new TA.

For technical effects brought by the eighth aspect, refer to the technical effects brought by the first aspect. Details are not described herein again.

BRIEF DESCRIPTION OF DRAWINGS

FIG. 6 is a schematic interaction diagram 1 of a tracking area selection method according to an embodiment of this application:

DESCRIPTION OF EMBODIMENTS

For ease of understanding technical solutions in embodiments of this application, the following first briefly describes technologies related to this application.

Figures 1, 2:
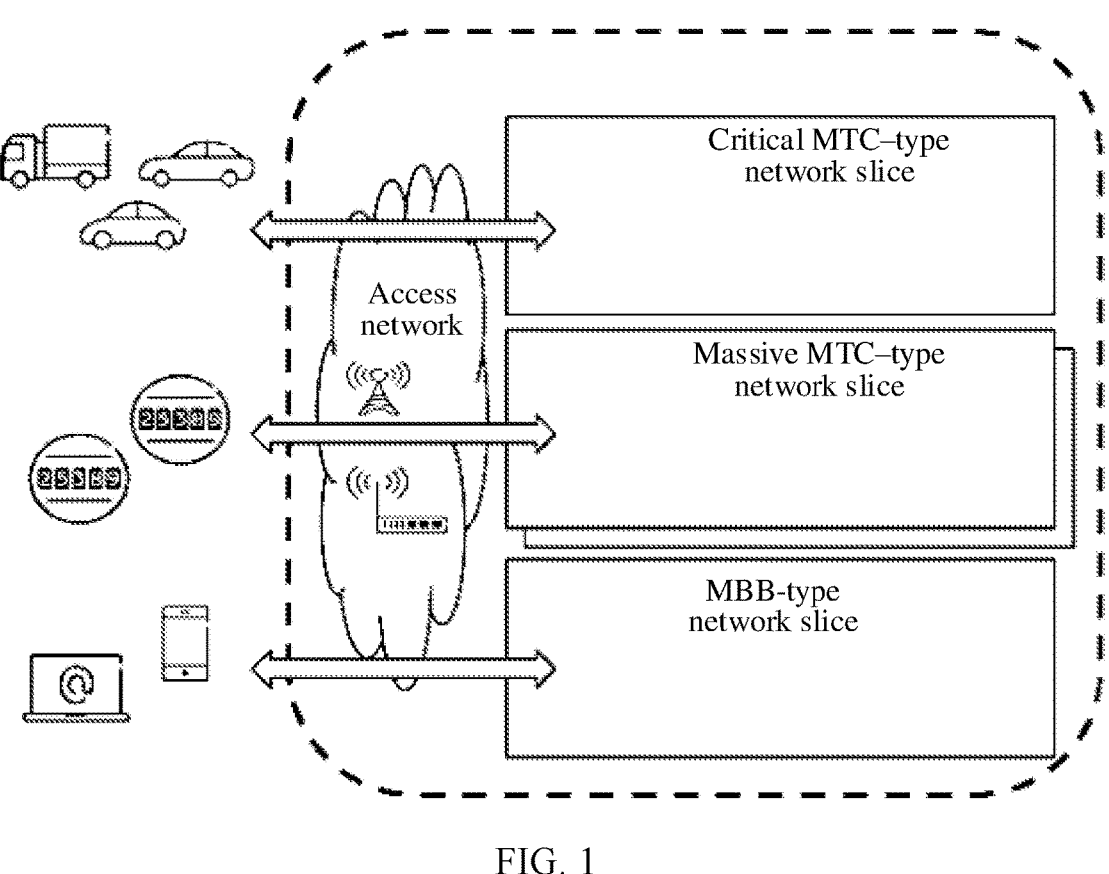
FIG. 1 is a schematic diagram of different types of network slices.
FIG. 2 is a schematic diagram of a structure of a communication system according to an embodiment of this application.

Network slice (NS): is a logical network having specific network features, and is a key technology that meets a network differentiation requirement of a 5th generation (5G) mobile communication network proposed by the 3rd generation partnership project (3GPP). Currently-defined standard network slice types include mobile broadband (MBB), enhanced mobile broadband (eMBB), ultra-reliable low-latency communication (URLLC), massive Internet of things (MIOT), massive machine type communication (massive MTC), critical machine type communication (critical MTC), and the like. Different network slices have different network features, and the network slices need to be isolated from each other and do not affect each other. Considering that performance requirements of various network slices are different, different network slices may correspond to different radio resources (for example, frequencies or frequency bands) that are needed for access. For example, as shown in FIG. 1, there is an MBB-type network slice, a massive MTC-type network slice, and a critical MTC-type network slice. The three types of slices are isolated from each other and do not affect each other. For the MBB-type network slice, a terminal needs to access this type of network slice at 2.6 GHZ (GHz) or 4.9 GHZ. For an MTC-type (massive MTC-type or critical MTC-type) network slice, a terminal needs to access this type of a network slice at 2.6 GHZ.

Network slice instance (NSI): is an instantiated network created by an operator on an infrastructure based on a network slice template, and includes different network function entities and physical resources. Different network slice instances are logically isolated from each other. One or more NSIs may be obtained through instantiation of one network slice, and each NSI is identified by a network slice instance identifier (NSI ID). Network slice instances of different service types may be deployed on different network slices, and different NSIs of a same service type may be deployed on a same network slice or different network slices. Network slice selection assistance information (NSSAI): indicates one or more network slices, and may include a plurality of pieces of single network slice selection assistance information (S-NSSAI). A network slice is identified by the S-NS-SAI. The S-NSSAI includes a slice/service type (SST) and a slice differentiator (SD). The SST and the SD may be defined in a standard or customized by the operator. The SD is optional information for supplementing the SST to distinguish between a plurality of network slices of a same SST, and may represent a homing relationship of the network slice. Types and functions of NSSAI that are defined in the standard 23.501 are enumerated in Table 1.

It should be noted that in embodiments of this application, the S-NSSAI may be referred to as identification information of a network slice, and the NSSAI is referred to as a set of identification information of one or more network slices.

TABLE 1

| Type | Function description |
|---|---|
| Configured NSSAI | NSSAI preconfigured for a terminal |
| Allowed NSSAI | Is sent to the terminal in a registration procedure, and indicates NSSAI of a network slice that the terminal is allowed to access in a current registration area. |
| Pending NSSAI | Is sent to the terminal in the registration procedure, and indicates that S-NSSAI on which network slice-specific authentication and authorization (NSSAA) need to be performed is pending. |
| Subscribed NSSAI | S-NSSAI included in subscription data of the terminal |
| Requested NSSAI | S-NSSAI of a network slice that the terminal requests in the registration procedure to access |
| Rejected NSSAI | NSSAI of a network slice that the terminal is rejected to access, where a rejection cause is that a current TA does not support the network slice. |

A tracking area (TA) may be location information of a terminal. Multiple TAs may form a TA list, and are allocated to one terminal. TA update does not need to be performed when the terminal moves between TAs in the TA list, to reduce frequent interaction with a network. The TA may be a cell-level configuration. A same TA may be configured for multiple cells, and one cell belongs to only one TA. One or more network slices may be deployed in one TA. If a network slice is deployed in a specific TA, all cells in the TA support the network slice, and the terminal can access the network slice through any cell in the TA. A network slice not supported by the TA may be interchangeably described as a network slice unavailable to the TA. That the TA does not support the network slice may be understood as not supporting the terminal in accessing the network slice through the TA. A correspondence between a TA and a network slice supported by the TA may be pre-stored in a mobility management network element.

It should be understood that a name of the tracking area and an abbreviation corresponding to the tracking area are not limited in embodiments of this application. The tracking area described in this application may be replaced with the TA, or may be replaced with another name, for example, a first area. This is not limited. The following uses the TA as the tracking area to describe a method provided in embodiments of this application. In addition, the network slice not supported by the TA in this application may be understood as: S-NSSAI of the network slice is not supported by/unavailable to the TA, or S-NSSAI is not supported by/unavailable to the TA. The S-NSSAI corresponds to the network slice not supported by/unavailable to the TA.

For example, Table 2 enumerates a correspondence between a TA and S-NSSAI of a network slice supported by the TA. As enumerated in Table 2, it is assumed that three types of network slices are deployed in a network, and S-NSSAI of the three types of network slices is respectively S-NSSAI-1, S-NSSAI-2, and S-NSSAI-3, where TAs supporting the S-NSSAI-1 include a TA 1, a TA 2, and a TA 4, and TAs supporting the S-NSSAI-1 include the TA 2, a TA 3, and the TA 4, and TAs supporting the S-NSSAI-3 include the TA 1, the TA 3, and the TA 4.

TABLE 2

| S-NSSAI of the network slice | TAs supporting the network slice |
|---|---|
| S-NSSAI-1 | TA 1, TA 2, and TA 4 |
| S-NSSAI-2 | TA 2, TA 3, and TA 4 |
| S-NSSAI-3 | TA 1, TA 3, and TA 4 |

However, in an actual deployment scenario, there may be a correspondence between a network slice and a frequency, and the frequency corresponding to the network slice may be a frequency for accessing the network slice. In this application, the frequency may be referred to as an access frequency. In other words, the terminal may access the network slice through a dedicated frequency (or the frequency corresponding to the network slice). However, the terminal does not aware a network slice deployment status, and blindly selects a cell for camping. Consequently, a frequency corresponding to the cell selected by the terminal does not support a network slice that the terminal expects to access, and a service requirement of the terminal cannot be met.

In an existing 3GPP standard, to ensure that a cell selected by a terminal supports a network slice that the terminal expects to access, the following method is proposed: If a mobility management network element determines that requested NSSAI includes S-NSSAI of a network slice that is not supported by a current TA, where this is alternatively understood as that a mobility management network element determines that requested NSSAI includes S-NSSAI of a network slice unavailable to a current TA, the mobility management network element rejects access of the terminal to the network slice, adds the S-NSSAI of the network slice to NSSAI of a network slice that the terminal is rejected to access, and generates rejected NSSAI and a rejection cause value: The network slice is not supported by/unavailable to the current TA. The mobility management network element obtains target NSSAI based on the rejected NSSAI. In this case, the obtained target NSSAI may include a part or all of pieces of S-NSSAI in the NSSAI of the network slice that the terminal is rejected to access and a part or all of pieces of S-NSSAI in NSSAI (allowed NSSAI) of a network slice that the terminal is allowed to access. The mobility management network element obtains, based on the target NSSAI, a radio access technology/frequency selection priority (RAT/frequency selection priority, RFSP) index corresponding to the target NSSAI, and sends the target NSSAI and the RFSP index to an access network device, to trigger the access network device to determine a target TA (where the target TA may support any network slice corresponding to the target NSSAI), and further trigger, through a radio resource control (RRC) redirection procedure, the terminal to access, through a cell (where the cell may be referred to as a target cell) in the target TA, the network slice corresponding to the target NSSAI.

For example, it is assumed that frequencies corresponding to a network slice 1 and a network slice 2 are respectively F1 and F2, a TA 1 supports the network slice 1, a TA 2 supports both the network slice 1 and the network slice 2, the terminal accesses a cell in the TA 1 through F1 by using a cell selection mechanism, and requested NSSAI sent by the terminal corresponds to the network slice 1 and the network slice 2. However, the TA 1 supports only the network slice 1 and does not support the network slice 2. In this case, the mobility management network element rejects access of the terminal to the network slice 2, where allowed NSSAI includes S-NSSAI of the network slice 1, and rejected NSSAI includes S-NSSAI of the network slice 2. To enable the terminal to select a cell in the TA 2 to access the network slice 1 and the network slice 2, the mobility management network element obtains target NSSAI (including the rejected NSSAI (namely, the S-NSSAI of the network slice 2) and the allowed NSSAI (namely, the S-NSSAI of the network slice 1)), further obtains an RFSP index corresponding to the target NSSAI, and sends the target NSSAI and the RFSP index to an access network device. The access network device determines, based on the RFSP index, whether a frequency of a surrounding cell meets a condition. If the condition is met, the access network device performs an RRC release procedure to redirect the terminal to the cell in the TA 2, so that the terminal accesses the network slice 1 and the network slice 2 through the cell in the TA 2, to meet a service requirement of the terminal and improve service experience of the terminal.

However, a scenario in which requested NSSAI includes both S-NSSAI not supported by a current TA and S-NSSAI on which an NSSAA procedure needs to be performed is not considered in the existing 3GPP standard, and solutions to the following problems are not provided:

Problem 1: In a registration procedure, allowed NSSAI determined by a mobility management network element includes S-NSSAI on which an NSSAA procedure does not need to be performed. This may be understood as: S-NSSAI included in the allowed NSSAI in this case is a temporary value. After the NSSAA procedure ends, the mobility management network element may update the allowed NSSAI, for example, add S-NSSAI on which the NSSAA procedure is successfully performed to the allowed NSSAI. A change from the original allowed NSSAI to updated allowed NSSAI further affects determining of target NSSAI. Therefore, the target NSSAI determined based on the allowed NSSAI determined before the NSSAA procedure is inaccurate.

It is assumed that requested NSSAI includes S-NSSAI-1. S-NSSAI-2, and S-NSSAI-3, the three pieces of S-NSSAI are included in subscribed NSSAI of UE, and a RAN that the UE currently accesses is in a TA 3. If the TA 3 supports the S-NSSAI-2 and the S-NSSAI-3, rejected NSSAI includes the S-NSSAI-1. If the NSSAA does not need to be performed on the S-NSSAI-3 supported by the TA 3, and needs to be performed on the S-NSSAI-2 supported by the TA 3, the determined allowed NSSAI includes {S-NSSAI-3}, pending NSSAI includes {S-NSSAI-2}, and the rejected NSSAI includes {S-NSSAI-1}. According to an existing method, before the NSSAA procedure, the target NSSAI is determined based on {S-NSSAI-3} included in the allowed NSSAI and {S-NSSAI-1} included in the rejected NSSAI. Because a TA 1 and a TA 4 support both the S-NSSAI-1 and the S-NSSAI-3, it is determined that the target NSSAI includes {S-NSSAI-1, the S-NSSAI-3}. It can be learned from Table 2 that the terminal can access the S-NSSAI-1 and the S-NSSAI-3 through the TA 1 or the TA 4. If radio resource information corresponding to the target NSSAI determined on a network side is supported by the TA 1, the terminal accesses the S-NSSAI-1 and the S-NSSAI-3 through the TA 1, but still cannot access the S-NSSAI-2 because the TA 1 does not support the S-NSSAI-2.

In comparison, if NSSAA on the S-NSSAI-2 is successfully performed after the NSSAA procedure ends, the UE is allowed to access a network slice corresponding to the S-NSSAI-2. Current allowed NSSAI includes {S-NSSAI-2. S-NSSAI-3}, and the rejected NSSAI includes {S-NSSAI-1}. If the method described below in embodiments of this application is applied, the target NSSAI is determined based on {S-NSSAI-2. S-NSSAI-3} included in the allowed NSSAI and {S-NSSAI-1} included in the rejected NSSAI. Because the TA 4 supports all the S-NSSAI-1, the S-NSSAI-2, and the S-NSSAI-3, it is determined that the target NSSAI includes {S-NSSAI-1. S-NSSAI-2. S-NSSAI-3}, and the terminal can access the S-NSSAI-1, the S-NSSAI-2, and the S-NSSAI-3 through the TA 4. In this case, the terminal can access three network slices through the TA 4, and all requirements of the terminal can be met.

It can be learned that the target NSSAI determined on the network side before and after the NSSAA procedure is different. If a result of the NSSAA procedure is not considered on the network side, the target NSSAI determined before the NSSAA procedure is inaccurate, and an access requirement of a user cannot be well met.

Problem 2: In a scenario in which a deregistration procedure is caused by a failure in an NSSAA procedure, if accurate target NSSAI and an accurate RFSP index are not determined, a terminal may still select an incorrect TA during re-registration, and cannot successfully access a network slice.

It is assumed that requested NSSAI includes S-NSSAI-1. S-NSSAI-2, and S-NSSAI-3, the three pieces of S-NSSAI are included in subscribed NSSAI of UE, and a RAN that the UE currently accesses is in a TA 3. As enumerated in Table 2, the TA 3 supports the S-NSSAI-2 and the S-NSSAI-3. In this case, rejected NSSAI includes the S-NSSAI-1. If NSSAA needs to be performed on both the S-NSSAI-2 and the S-NSSAI-3 that are supported by the TA 3, determined allowed NSSAI is empty. In this application, that the allowed NSSAI is empty may be represented by allowed NSSAI {empty}. According to an existing method, before the NSSAA procedure, target NSSAI is determined based on the allowed NSSAI {empty} and {S-NSSAI-1} included in the rejected NSSAI. Because the allowed NSSAI includes no S-NSSAI, the target NSSAI includes {S-NSSAI-1}. If radio resource information corresponding to the target NSSAI determined on a network side is supported by a TA 1, the terminal accesses the S-NSSAI-1 through the TA 1, but still cannot access the S-NSSAI-2 and the S-NSSAI-3 because the TA 1 does not support the S-NSSAI-2 and the S-NSSAI-3.

If the NSSAA on both the S-NSSAI-2 and the S-NSSAI-3 fails after the NSSAA procedure ends, a network slice that the UE is allowed to access does not change, and is still the empty allowed NSSAI. A network needs to initiate a deregistration procedure for the terminal. The terminal can obtain only the radio resource information supported by the TA 1, and still does not know which TA supports the S-NSSAI-2 and the S-NSSAI-3. Therefore, the terminal may still select an incorrect TA during re-registration, and consequently cannot access the S-NSSAI-2 and the S-NSSAI-3.

It can be learned that the target NSSAI determined on the network side before the NSSAA procedure is inaccurate. This is because if the deregistration procedure is initiated for the terminal after the NSSAA procedure, the terminal can access only a network slice included in the target NSSAI, but cannot access a network slice on which the NSSAA procedure fails to be performed.

To resolve the foregoing technical problems, embodiments of this application provide a method: A mobility management network element initiates an authentication and authorization procedure for a network slice on which authentication and authorization are to be performed and that is in a network slice requested by a terminal; determines, based on a result of the authentication and authorization procedure, identification information of a network slice that the terminal is allowed to access; obtains, based on first information (for example, identification information of the network slice requested by the terminal or identification information of a network slice that the terminal is rejected to access) and the identification information of the network slice that the terminal is allowed to access, identification information of a target network slice and radio resource information corresponding to the target network slice; and sends the identification information of the target network slice and the radio resource information corresponding to the target network slice to an access network device, so that the access network device triggers, based on the identification information of the target network slice and the radio resource information corresponding to the target network slice, the terminal to successfully access a network slice supported by a new TA. To be specific, allowed NSSAI is determined with reference to a result of the NSSAA procedure, to ensure accuracy of determined target NSSAI, and further ensure that the terminal successfully accesses, through the new TA, a network slice corresponding to the target NSSAI. Specifically, for an implementation process of the method, refer to descriptions in FIG. 5 to FIG. 11B.

It should be understood that, in embodiments of this application, the identification information that is included in first information and that is of the network slice that the terminal is rejected to access may be the rejected NSSAI enumerated in Table 1, namely, rejected NSSAI whose rejection cause is that the current TA does not support the NSSAI.

Optionally, the first information may be stored in the mobility management network element, so that the mobility management network element obtains, based on the locally stored first information, the identification information that is determined before the authentication and authorization procedure and that is of the network slice that the terminal is rejected to access, and further determines the identification information of the target network slice based on the identification information of the network slice that the terminal is rejected to access, to resolve the following problem: The rejected NSSAI has been sent to the terminal in a registration accept message. However, because the mobility management network element does not store the rejected NSSAI, the mobility management network element cannot obtain the rejected NSSAI after the NSSAA procedure, and consequently cannot obtain the target NSSAI based on the rejected NSSAI.

With reference to the accompanying drawings in this specification, the following describes a tracking area selection method provided in embodiments of this application.

It should be understood that a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

Using a communication system shown in FIG. 2 as an example, the following describes the tracking area selection method provided in embodiments of this application.

FIG. 2 shows a communication system 20 according to an embodiment of this application. The communication system 20 includes a mobility management network element, an access network device, a terminal, and one or more network slices. Optionally, the communication system 20 further includes a network slice selection function network element, a data management network element, a policy control network element, an authentication and authorization network element, and the like.

The access network device may cover one or more TAs. One TA may include one or more cells. One cell may correspond to one access frequency. One or more network slices may be deployed in one TA. The terminal may access, through an access frequency corresponding to a specific cell in the TA, the network slice supported by the TA. For example, coverage areas of a same access network device include a TA 1 and a TA 2. The TA 1 includes a cell 1, and supports a network slice 1, a frequency of the cell 1 is F1, and the terminal may access the network slice 1 through F1. The TA 2 includes a cell 2, an access frequency of the cell 2 is F2, the TA 2 supports the network slice 1 and a network slice 2, and the terminal may access the network slice 1 and the network slice 2 through F2. This may be understood as: In this scenario, the terminal does not need to change the access network device, and only needs to access the network slice through another TA supported by the access network device. For another example, a coverage area of an access network device 1 includes a TA 1, and a coverage area of an access network device 2 includes a TA 2. The TA 1 includes a cell 1, and supports a network slice 1, a frequency of the cell 1 is F1, and through F1, the terminal may camp on the cell 1 in the TA 1 and access the network slice 1. The TA 2 includes a cell 2, an access frequency of the cell 2 is F2, the TA 2 supports a network slice 2, and through F2, the terminal may camp on the cell 2 in the TA 2 and access the network slice 2. This may be understood as: In this scenario, the terminal needs to change the access network device to access different network slices. It should be noted that whether the terminal needs to change the access network device to access a target network slice corresponding to target NSSAI is not limited in this application. The following describes the network elements in the system shown in FIG. 2.

The mobility management network element is mainly used for mobility management such as user location update, registration of a user with a network, and user switching in a mobile network. In a 5G communication system, the mobility management network element may be an access and mobility management function (AMF) network element, and Namf is a service-oriented interface provided by the AMF network element. The AMF network element may communicate with another network function through Namf. In future communication such as 6th generation (6G) communication, the mobility management network element may still be the AMF network element or have another name. This is not limited in embodiments of this application.

The terminal may be a device configured to implement a wireless communication function, for example, a terminal or a chip that may be used in the terminal. The terminal may be deployed on the land, including an indoor device, an outdoor device, a handheld device, or a vehicle-mounted device;

may be deployed on the water (for example, on a ship); or may be deployed in the air (for example, on an airplane, a balloon, and a satellite). The terminal may be user equipment (UE), an access terminal, a terminal unit, a terminal station, a mobile station, a remote station, a remote terminal, a mobile device, a wireless communication apparatus, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

The access network device (or referred to as a radio access network (RAN) device) is a device that provides the wireless communication function for the terminal. For example, the access network device includes but is not limited to a next-generation NodeB (gNodeB, gNB) in 5G, an evolved NodeB (eNB), a radio network controller (RNC), a NodeB (NB), a base station controller (BSC), a base transceiver station (BTS), a home base station (for example, home evolved NodeB, or home NodeB, HNB), a baseband unit (BBU), a transmission reception point (TRP), a transmission point (TP), a mobile switching center, and the like.

The network slice selection function network element is configured to select a network slice for the terminal and so on. In the 5G communication system, the network slice selection function network element may be a network slice selection function (NSSF) network element, and Nnssf is a service-oriented interface provided by the NSSF network element. The NSSF network element may communicate with another network function through Nnssf. In the future communication such as the 6G communication, the network slice selection function network element may still be the NSSF network element or have another name. This is not limited in embodiments of this application.

The data management network element may be configured to store user data, for example, subscription data and authentication or authorization data of the user. Specifically, a network repository network element may be a unified data management (UDM) network element, a network repository function (NRF), a unified data repository (UDR), or the like.

The policy control network element may be configured to provide a policy, for example, a quality of service policy, a slice selection policy, and an RFSP index, for the mobility management network element and a session management function network element.

The authentication and authorization network element may be configured to perform authentication, authorization, charging, and the like on a network slice and the like. Specifically, the authentication and authorization network element may be an authentication, authorization, and accounting (AAA) network element or the like.

It should be noted that FIG. 2 is merely an example of an architectural diagram. The system may further include another function network element, for example, an operation and management (O&M) network element, in addition to the functional units shown in FIG. 2. This is not limited in embodiments of this application. In addition, the names of the devices in FIG. 2 are not limited. The devices may alternatively have other names in addition to the names shown in FIG. 4. For example, the names may be replaced with names of network elements having same or similar functions. This is not limited.

The system shown in FIG. 2 may be a 3rd generation partnership project (3GPP) communication system, for example, a 4th generation (4G) communication system or a long term evolution (LTE) system; may be any one of a 5th generation (5G) communication system, a new radio (NR) system, an NR-vehicle-to-everything (V2X) system, or an Internet of things system; or may be another next-generation communication system or the like. This is not limited.

Figure 3A:
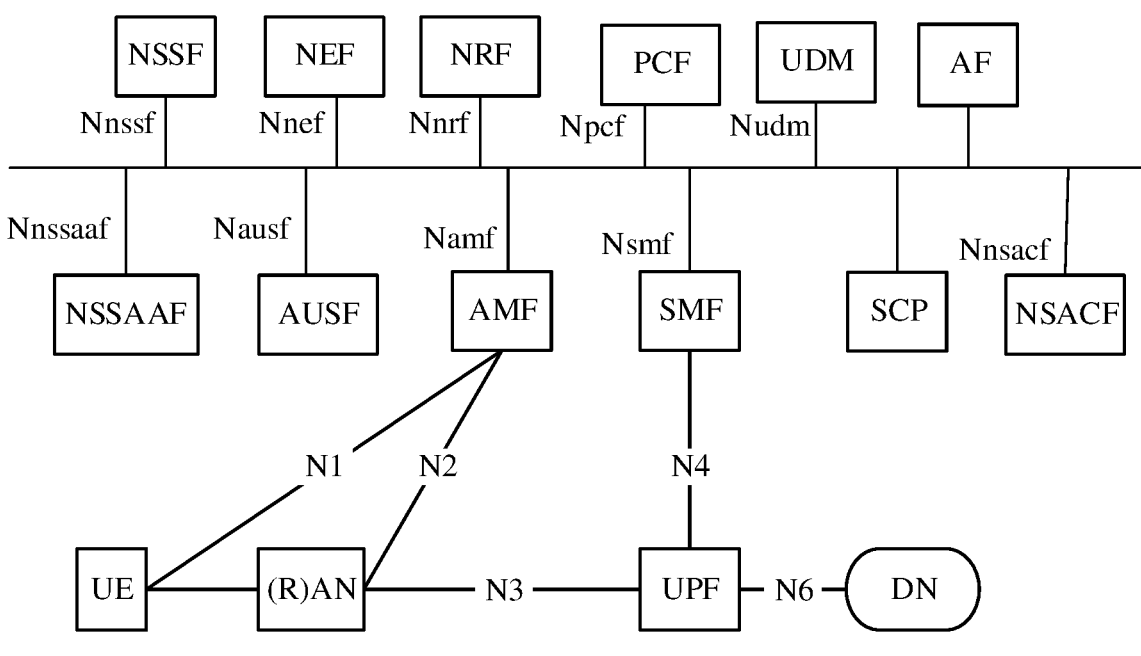
FIG. 3a is a schematic diagram of a possible network architecture corresponding to the communication system shown in FIG. 2 according to an embodiment of this application.
Figure 3B:
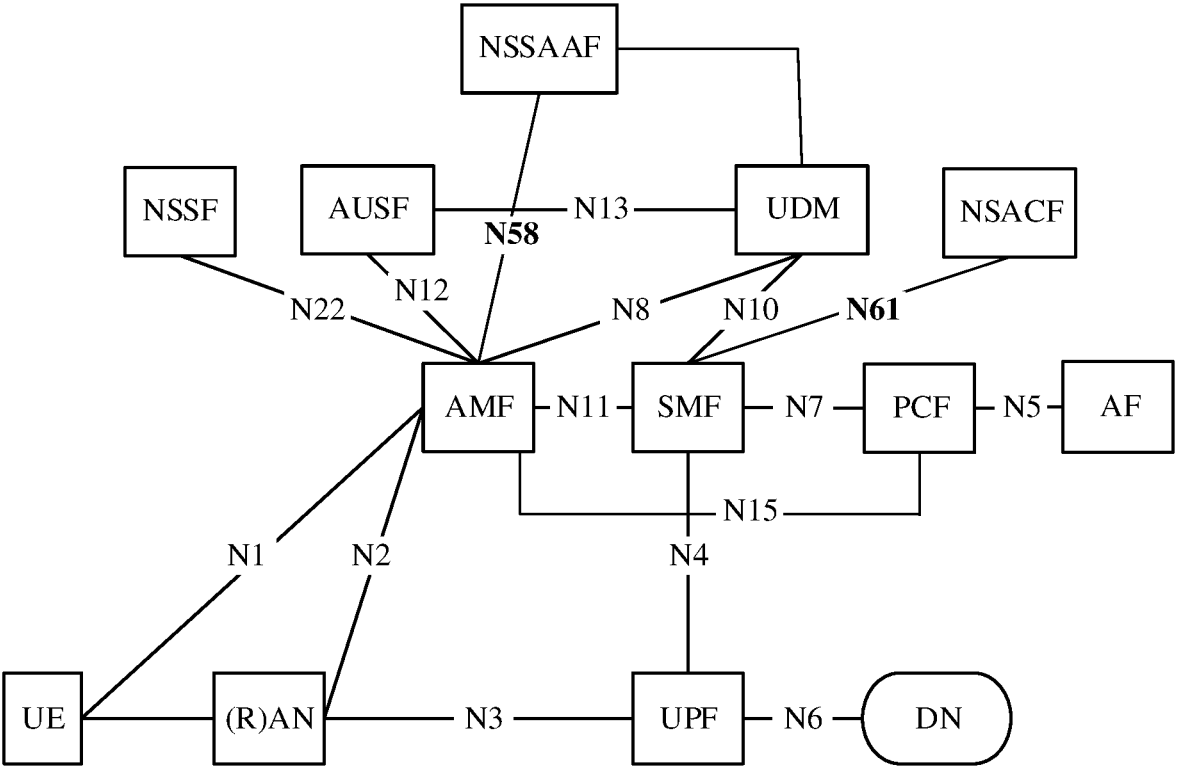
FIG. 3b is a schematic diagram of a possible network architecture corresponding to the communication system shown in FIG. 2 according to an embodiment of this application.

Using an example in which the communication system shown in FIG. 2 is a 5G communication system shown in FIG. 3a or FIG. 3b, as shown in FIG. 3a or FIG. 3b, the 5G communication system may include UE, a data network (DN), and an operator network. The operator network may include one or more of the following network elements: an authentication server function (AUSF), a network slice-specific authentication and authorization function (NS-SAAF), a network slice admission control function (NSACF), an NSSF, a service communication proxy (SCP), a network exposure function (NEF), a policy control function (PCF), a unified data management (UDM), a network repository function (NRF), an application function (AF), an access and mobility management function (AMF), a session management function (SMF), a radio access network (RAN), and a user plane function (UPF).

An operator may deploy different network functions such as the SMF, the UPF, and the PCF network element in FIG. 3a or FIG. 3b in a network slice based on a network slice template, to meet network performance and function requirements specified in the network slice template. When the terminal requests to access a specific network slice, a network function supporting the network slice provides a service for the terminal.

FIG. 3a is a schematic diagram of a 5G communication system that is based on a service-oriented interface. The control plane network elements such as the AMF, the SMF, and the NSSF shown in FIG. 3a may interact with each other through a service-oriented interface. For example, a service-oriented interface externally provided by the AMF may be Namf, a service-oriented interface externally provided by the SMF may be Nsmf, a service-oriented interface externally provided by the PCF may be Npcf. and a service-oriented interface externally provided by the NSSF may be Nnssf.

FIG. 3b is a schematic diagram of a 5G communication system that is based on a point-to-point interface. A main difference between FIG. 3b and FIG. 3a lies in: An interface between the network elements in FIG. 3b is a point-to-point interface instead of a service-oriented interface. As shown in FIG. 3b, an N1 interface in FIG. 3b is a reference point between the terminal and the AMF. An N2 interface is a reference point between the RAN device and the AMF, and is configured to send a non-access stratum (NAS) message and a next generation application protocol (NGAP) message and so on. An N3 interface is a reference point between the RAN device and the UPF, and is for transmission of user plane data and the like. An N4 interface is a reference point between the SMF and the UPF, and is for transmission of information such as tunnel identification information of an N3 connection, data buffer indication information, and a downlink data notification message. An N9 interface is a reference point between UPFs. Other interfaces are not described one by one herein.

Optionally, the mobility management network element, the access network device, or the network slice selection function network element in embodiments of this application may also be referred to as a communication apparatus, and may be a general-purpose device or a special-purpose device. This is not specifically limited in embodiments of this application.

Optionally, related functions of the mobility management network element, the access network device, or the network slice selection function network element in embodiments of this application may be implemented by one device, may be jointly implemented by a plurality of devices, or may be implemented by one or more functional modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figure 4:
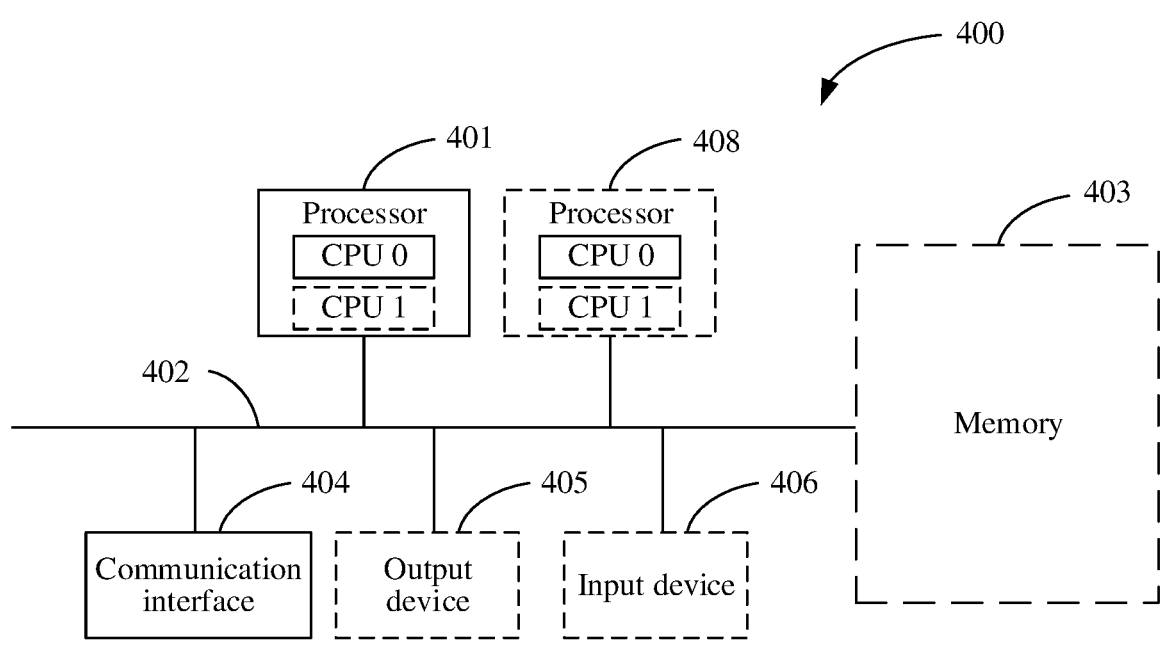
FIG. 4 is a schematic diagram of a structure of a communication apparatus according to an embodiment of this application.

For example, the related functions of the mobility management network element or the access network device in embodiments of this application may be implemented by a communication apparatus 400 in FIG. 4. FIG. 4 is a schematic diagram of a structure of the communication apparatus 400 according to an embodiment of this application. The communication apparatus 400 includes one or more processors 401, a communication line 402, and at least one communication interface (where in FIG. 4, only an example in which a communication interface 404 and one processor 401 are included is used for description), and optionally, may further include a memory 403.

The processor 401 may be a general-purpose central processing unit (CPU), a microprocessor, an application-specific integrated circuit (ASIC), or one or more integrated circuits configured to control program execution of the solutions in this application.

The communication line 402 may include a path for connecting different components.

The communication interface 404 may be configured to communicate with another device or a communication network, for example, an Ethernet, a RAN, or a wireless local area network (WLAN). For example, the communication interface 404 may be a transceiver-type apparatus. Optionally, the communication interface 404 may alternatively be a transceiver circuit in the processor 401, and is configured to input a signal into and output a signal from the processor.

The memory 403 may be an apparatus having a storage function. For example, the memory 403 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction structure or a data structure and that is accessible to a computer, but is not limited thereto. The memory may exist independently, and is connected to the processor through the communication line 402. The memory may alternatively be integrated with the processor.

The memory 403 is configured to store computer-executable instructions for executing the solutions in this application, and the processor 401 controls the execution. The processor 401 is configured to execute the computer-executable instructions stored in the memory 403, to implement the tracking area selection method provided in embodiments of this application. Alternatively, optionally, in this embodiment of this application, the processor 401 may perform a processing-related function in the tracking area selection method provided in the following embodiments of this application, and the communication interface 404 is responsible for communicating with the another device or the communication network. This is not specifically limited in this embodiment of this application.

Optionally, the computer-executable instructions in embodiments of this application may also be referred to as application program code. This is not specifically limited in embodiments of this application.

During specific implementation, in an embodiment, the processor 401 may include one or more CPUs such as a CPU 0 and a CPU 1 in FIG. 4. During specific implementation, in an embodiment, the communication apparatus 400 may include a plurality of processors, for example, the processor 401 and a processor 408 in FIG. 4. Each of these processors may be a single-core processor or a multi-core processor. The processor herein may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication apparatus 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The communication apparatus 400 may also be referred to as a communication device sometimes, and may be a general-purpose device or a special-purpose device. For example, the communication apparatus 400 may be a desktop computer, a portable computer, a network server, a personal digital assistant (PDA), a mobile phone, a tablet computer, a wireless terminal, an embedded device, the foregoing terminal, the foregoing network device, or a device having a structure similar to that in FIG. 4. A type of the communication apparatus 400 is not limited in this embodiment of this application. In addition, the composition structure shown in FIG. 4 does not constitute a limitation on the communication apparatus. In addition to the components shown in FIG. 4, the communication apparatus may include more or fewer components than those shown in the figure, some components may be combined, or different component arrangement may be used.

In embodiments of this application, a chip system may include a chip, or may include a chip and another discrete component.

With reference to the communication system shown in FIG. 2, the following describes the tracking area selection method provided in embodiments of this application. Devices in the following embodiments may have the components shown in FIG. 4, and actions, terms, and the like in embodiments may be mutually referenced. In embodiments, names of messages exchanged between the devices, names of parameters in the messages, or the like are merely examples, and may alternatively be other names in a specific implementation. This is not limited. In addition, terms such as "first" and "second" in embodiments of this application are for distinguishing between different objects, but are not for describing a specific sequence of the objects. Attributes of different objects represented by "first" and "second" are not limited in embodiments of this application.

Figure 5:
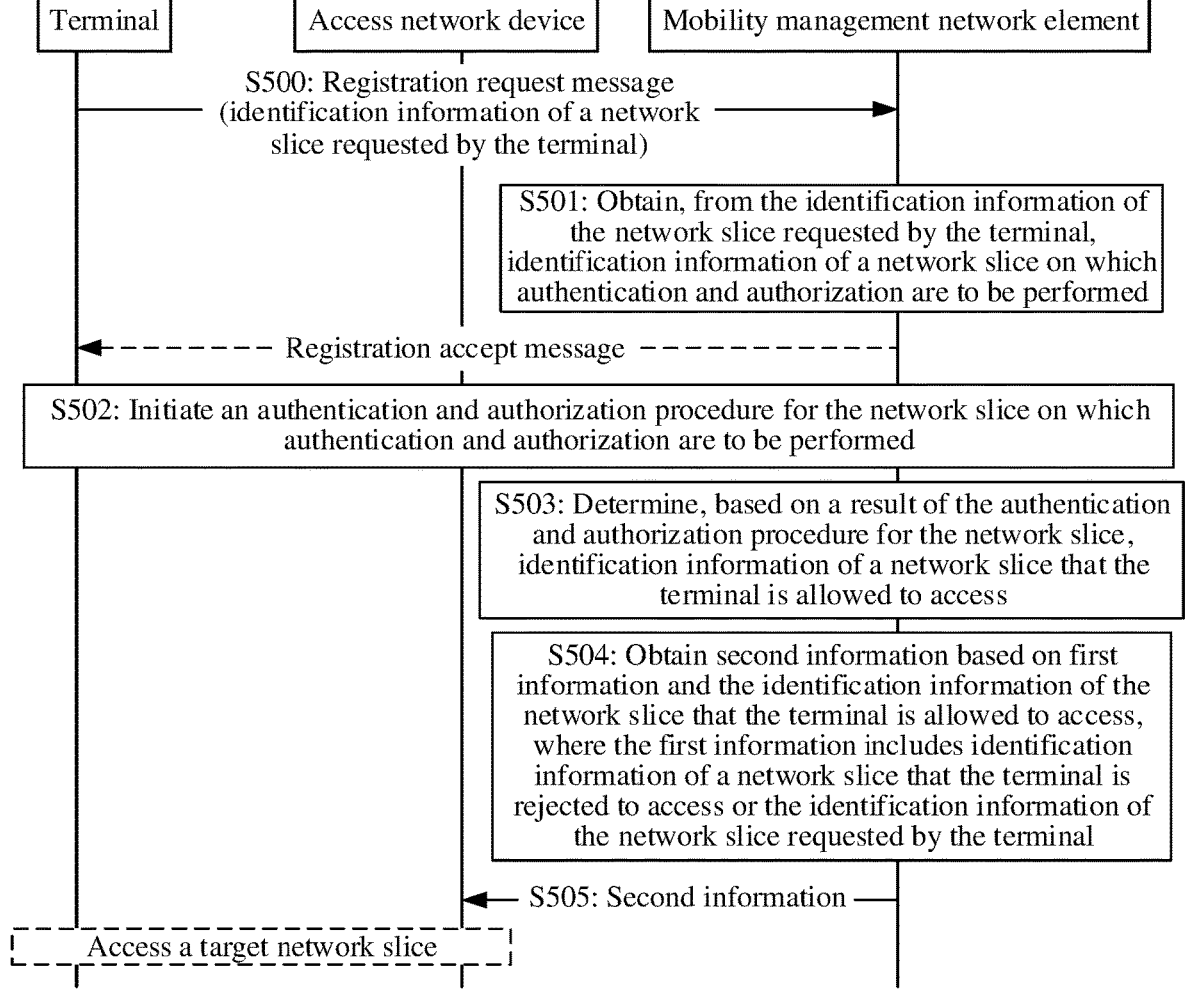
FIG. 5 is a schematic flowchart of a tracking area selection method according to an embodiment of this application.

FIG. 5 shows a tracking area selection method according to an embodiment of this application. The method includes the following steps.

S500: A terminal sends a registration request message to a mobility management network element through an access network device accessed by the terminal. Correspondingly, the mobility management network element receives the registration request message.

The terminal may be any terminal in FIG. 2 that initiates a registration procedure. For example, the terminal may be a terminal 1 or a terminal 2 in FIG. 2. The access network device may be an access network device that currently provides an access service for the terminal, and the terminal may send the registration request message to the mobility management network element through the access network device. The mobility management network element may be the mobility management network element in FIG. 2 that manages the access network device and establishes a non-access stratum (NAS) connection to the terminal.

The registration request message may include identification information of a network slice requested by the terminal and other information such as identification information of the terminal. The network slice requested by the terminal may be a network slice that the terminal requests to access, and is a network slice that the terminal requests to access through a TA in which the access network device is located. The network slice requested by the terminal may include one or more network slices. This is not limited. It should be noted that, in this embodiment of this application, the TA in which the access network device currently accessed by the terminal is located may be referred to as a current TA. This is uniformly described herein, and details are not described below again.

In this embodiment of this application, the identification information of the network slice may identify the network slice. Identification information of a network slice may be S-NSSAI of the network slice. The identification information of the network slice requested by the terminal may be requested NSSAI of the terminal. Identification information of a network slice on which authentication and authorization are to be performed may be pending NSSAI. Identification information of a network slice that the terminal subscribes to may be subscribed NSSAI of the terminal. Identification information of a network slice that the terminal is allowed to access may be allowed NSSAI of the terminal. For descriptions of these pieces of NSSAI, refer to Table 1. Details are not described herein again.

S501: The mobility management network element obtains, from the identification information of the network slice requested by the terminal, the identification information of the network slice on which authentication and authorization are to be performed.

Using an example in which the identification information of the network slice is the S-NSSAI. S501 may be understood as: The mobility management network element obtains the pending NSSAI from the requested NSSAI.

For example, after the mobility management network element receives the registration request message, for each network slice requested by the terminal, the mobility management network element may determine, based on the network slice that the terminal subscribes to, whether access to the network slice requested by the terminal is allowed. If the mobility management network element determines that the network slice requested by the terminal is allowed in subscription, but the network slice requested by the terminal is not supported by the current TA, in other words, is unavailable to the current TA, the mobility management network element determines that the terminal is not allowed to access the requested network slice, in other words, rejects the terminal to access the network slice requested by the terminal, where a rejection cause value of the network slice may include that the network slice is not supported by the current TA (or is unavailable to the current TA), and this type of network slice belongs to the network slice that the terminal is rejected to access. Assuming that the identification information of the network slice is the S-NSSAI, identification information of this type of network slice whose rejection cause is that the current TA does not support the network slice belongs to rejected NSSAI, and is included in the rejected NSSAI. It should be understood that the rejected NSSAI in this embodiment of this application is S-NSSAI of the network slice whose rejection cause is that the current TA does not support the network slice and therefore access of the terminal is rejected.

If the mobility management network element determines that the network slice requested by the terminal is allowed in subscription, and the network slice requested by the terminal is supported by the current TA, in other words, is available to the current TA, the mobility management network element further determines whether a network slice-specific authentication and authorization (NSSAA) procedure needs to be performed on the network slice. A determining result may cause the following two cases:

(1) If the authentication and authorization do not need to be performed on the network slice, this type of network slice belongs to the network slice that the terminal is allowed to access. Assuming that the identification information of the network slice is the S-NSSAI, the identification information of this type of network slice may be directly included in the allowed NSSAI. It should be understood that, in this embodiment of this application, allowed NSSAI determined before the authentication and authorization procedure may be referred to as original allowed NSSAI. This is uniformly described herein, and details are not described below again.

(2) If the authentication and authorization need to be performed on the network slice, this type of network slice belongs to a candidate/pending network slice, and is the network slice on which authentication and authorization are to be performed. In this case, after the registration procedure, the mobility management network element may initiate the authentication and authorization procedure for the network slice on which authentication and authorization are to be performed. If authentication and authorization on a specific network slice succeed, the terminal is allowed to access the network slice, and identification information of the network slice is added to the allowed NSSAI, in other words, the allowed NSSAI is updated. If authentication and authorization on a specific network slice fail, the terminal is not allowed (or is rejected) to access the network slice, where a rejection cause value is that the authentication and authorization fail.

In this embodiment of this application, the mobility management network element may pre-store a TA list, and the TA list includes one or more TAs. The mobility management network element further stores a correspondence between a TA and identification information of a network slice supported by the TA. If the identification information of the network slice requested by the terminal is not included in the identification information of the network slice supported by the TA, it is determined that the TA does not support the network slice. For example, assuming that the mobility management network element stores {TA 1. S-NS-SAI-1} and {TA 2. S-NSSAI-1. S-NSSAI-2}, the terminal requests the S-NSSAI-1 and the S-NSSAI-2 through a RAN, and the RAN is in the TA 1, it may be determined, based on the correspondence stored in the mobility management network element, that the TA 1 does not support the S-NS-SAI-2, in other words, the current TA does not support the S-NSSAI-2. For another example, assuming that the mobility management network element stores {TA 1. S-NSSAI-1}. {TA 2. S-NSSAI-1. S-NSSAI-2}, and {TA 3. S-NSSAI-2. S-NSSAI-3}, the terminal requests the S-NSSAI-1, the S-NSSAI-2, and the S-NSSAI-3 through a RAN, and the RAN is located in the TA 3, it may be determined, based on the correspondence stored in the mobility management network element, that the TA 3 does not support the S-NS-SAI-1, in other words, the current TA does not support the S-NSSAI-1.

In this embodiment of this application, related information of the network slice that the terminal subscribes to may be pre-stored in subscription data of the terminal. The subscription data of the terminal may include the identification information of the network slice that the terminal subscribes to and indication information indicating whether the network slice NSSAA needs to be performed on each subscribed network slice. A correspondence between the identification information of the network slice that the terminal subscribes to and the indication information indicating whether the network slice authentication and authorization need to be performed on the network slice may be included in the subscription data of the terminal in a form of a list. The subscription data of the terminal may be pre-stored in a data storage network element, for example, a UDM. The mobility management network element may obtain the subscription data of the terminal from the data storage network element.

In this embodiment of this application, when the network slice requested by the terminal is included in the network slice that the terminal subscribes to, it may be considered that the network slice requested by the terminal is allowed in subscription. If the identification information of the network slice requested by the terminal is included in the subscription data of the terminal, and the subscription data of the terminal indicates that the network slice-specific authentication and authorization need to be performed, the identification information of the network slice is determined as the identification information of the network slice on which authentication and authorization are to be performed.

Using the example in which the identification information of the network slice is the S-NSSAI. Table 3 enumerates a correspondence between S-NSSAI and indication information indicating whether network slice-specific authentication and authorization need to be performed on a network slice. It should be understood that Table 3 is merely an example table, and other S-NSSAI may be further included in addition to the S-NSSAI enumerated in Table 3. This is not limited. As enumerated in Table 3, the subscribed NSSAI of the terminal includes S-NSSAI-1, S-NSSAI-2, and S-NS-SAI-3, where the network slice-specific authentication and authorization need to be performed on the S-NSSAI-1 and the S-NSSAI-2, and do not need to be performed on the S-NSSAI-3. Assuming that the identification information of the network slice requested by the terminal includes the S-NSSAI-2 and the S-NSSAI-3, the mobility management network element may search Table 3 by using the S-NS-SAI-2 as an index to determine that the network slice-specific authentication and authorization need to be performed on the S-NSSAI-2, and search Table 3 by using the S-NSSAI-3 as an index to determine that the network slice-specific authentication and authorization do not need to be performed on the S-NSSAI-3. In this case, in the S-NS-SAI-2 and the S-NSSAI-3 that are requested by the terminal, the pending NSSAI includes the S-NSSAI-2, and the allowed NSSAI includes the S-NSSAI-3.

TABLE 3

| Subscribed NSSAI of the terminal | Indication information indicating whether network slice-specific authentication and authorization need to be performed |
| --- | --- |
| S-NSSAI-1 | Yes |
| S-NSSAI-2 | Yes |
| S-NSSAI-3 | No |

Further, optionally, after S501, the mobility management network element sends a registration accept message to the terminal. The registration accept message corresponds to the registration request message in S500, and may include the identification information (for example, the original allowed NSSAI) of the network slice that the terminal is allowed to access, the identification information (for example, the rejected NSSAI) of the network slice that the terminal is rejected to access, and the identification information (for example, the pending NSSAI) of the network slice on which authentication and authorization are to be performed. In this way, the terminal learns of specific network slices that the terminal is allowed to access, specific network slices that the terminal is rejected to access, and specific network slices on which the authentication and authorization are to be performed in the network slices requested by the terminal, and the registration procedure initiated by the terminal in S500 is completed hereto.

In this embodiment of this application, the original allowed NSSAI may be NSSAI, in the requested NSSAI of the terminal, that belongs to the subscribed NSSAI of the terminal and on which the authentication and authorization do not need to be performed, and is allowed NSSAI stored in the mobility management network element after it is determined that the registration procedure is completed. A name of the original allowed NSSAI is not limited, and may alternatively be named old allowed NSSAI or first allowed NSSAI.

Further, optionally, the mobility management network element stores, in a context of the terminal, the identification information of the network slice that the terminal is allowed to access (in other words, stores the original allowed NSSI), to update, based on an authentication and authorization result after the authentication and authorization procedure ends, the stored identification information of the network slice that the terminal is allowed to access.

Further, optionally, the mobility management network element may further store first information. The first information may include the identification information of the network slice requested by the terminal or the identification information of the network slice that the terminal is rejected to access. For example, the first information is also stored in the context of the terminal, to determine identification information of a target network slice based on the stored first information and updated identification information of a network slice that the terminal is allowed to access.

In this embodiment of this application, when determining that the identification information of the network slice requested by the terminal includes the identification information of the network slice that the terminal is rejected to access, the mobility management network element may be triggered to store the first information in the mobility management network element.

Further, when determining that the identification information of the network slice requested by the terminal includes the identification information of the network slice that the terminal is rejected to access, the mobility management network element may further generate first indication information. The first indication information may indicate to perform one or more of the following: selecting a new TA for the terminal, where the new TA supports the target network slice; redirecting the terminal to a tracking area or a frequency band (redirection to a dedicated frequency band or dedicated frequency bands) that supports the target network slice; or obtaining second information for the terminal after the authentication and authorization procedure, so that after the authentication and authorization procedure, the mobility management network element determines the identification information of the target network slice in response to the first indication information based on the first information and the updated identification information of the network slice that the terminal is allowed to access.

Further, the mobility management network element stores the first indication information in the context of the terminal after generating the first indication information.

A name of the first indication information is not limited in this application. The first indication information may also be referred to as a flag or another name. This is not limited.

S502: The mobility management network element initiates the authentication and authorization procedure for the network slice on which authentication and authorization are to be performed.

Using the example in which the identification information of the network slice is the S-NSSAI. S502 may be understood as: The mobility management network element initiates the authentication and authorization procedure for S-NSSAI in the pending NSSAI.

For example, that the mobility management network element initiates the authentication and authorization procedure for the network slice on which authentication and authorization are to be performed may include: The mobility management network element indicates, to an authentication and authorization network element, the identification information of the network slice on which authentication and authorization are to be performed, to trigger the authentication and authorization network element to perform authentication and authorization on the network slice on which authentication and authorization are to be performed. The authentication and authorization network element feeds back the authentication and authorization result to the mobility management network element after the authentication and authorization end. The authentication and authorization network element may be an AAA network element. For a process in which the authentication and authorization network element performs authentication and authorization on the network slice, refer to a conventional technology. Details are not described.

S503: The mobility management network element determines, based on the result of the authentication and authorization procedure for the network slice, the identification information of the network slice that the terminal is allowed to access.

Using the example in which the identification information of the network slice is the S-NSSAI. S503 may be understood as: The mobility management network element determines the allowed NSSAI based on the result of the authentication and authorization procedure for the pending S-NSSAI. It should be understood that the identification information that is of the network slice that the terminal is allowed to access and that is determined in S503 may be new allowed NSSAI, and is allowed NSSAI determined based on the result of the authentication and authorization procedure. A name of the new allowed NSSAI is not limited, and may alternatively be named second allowed NSSAI.

Figure 7:
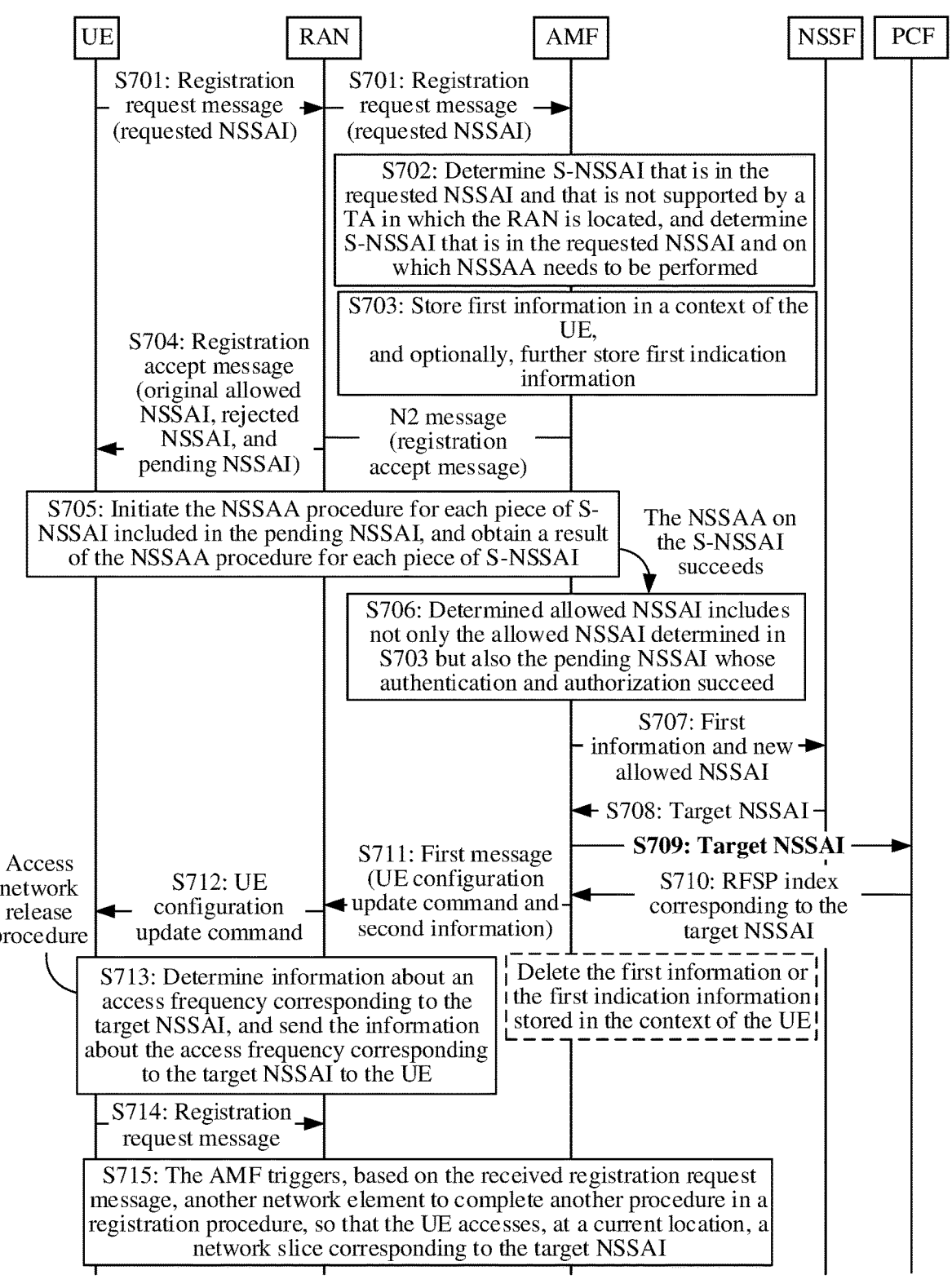
FIG. 7 is a schematic interaction diagram 2 of a tracking area selection method according to an embodiment of this application.

In this embodiment of this application, the result of the authentication and authorization procedure for the network slice may include that the authentication and authorization on the network slice succeed or that the authentication and authorization on the network slice fail. That the mobility management network element determines, based on the result of the authentication and authorization procedure for the network slice, the identification information of the network slice that the terminal is allowed to access may include the following two examples:

In an example, if the authentication and authorization on the network slice succeed, the mobility management network element updates the identification information of the network slice that the terminal is allowed to access. Specifically, the mobility management network element adds identification information of a network slice whose authentication and authorization succeed to the identification information that is stored in the context of the terminal and that is of the network slice that the terminal is allowed to access. Using the example in which the identification information of the network slice is the S-NSSAI, when the authentication and authorization on the S-NSSAI included in the pending NSSAI succeed, the original allowed NSSAI is updated, to be specific, the S-NSSAI whose authentication and authorization succeed and that is included in the pending NSSAI is added to the original allowed NSSAI. Specifically, the scenario is shown in FIG. 6 or FIG. 7.

In another example, if the authentication and authorization on the network slice fail, only identification information that is in the identification information of the network slice requested by the terminal and that is of a network slice on which the authentication and authorization do not need to be performed is determined as the identification information of the network slice that the terminal is allowed to access. Using the example in which the identification information of the network slice is the S-NSSAI, when the authentication and authorization on no S-NSSAI included in the pending NSSAI succeed, the original allowed NSSAI remains unchanged. Specifically, the scenario is shown in FIG. 8 to FIG. 11B.

For example, it is assumed that the pending NSSAI includes S-NSSAI-2, and the original allowed NSSAI includes S-NSSAI-3. If authentication and authorization on the S-NSSAI-2 succeed, the original allowed NSSAI is updated to the new allowed NSSAI, and the new allowed NSSAI includes the S-NSSAI-2 and the S-NSSAI-3. If authentication and authorization on the S-NSSAI-2 fail, the original allowed NSSAI remains unchanged, and still includes the S-NSSAI-3.

S504: The mobility management network element obtains the second information based on the first information and the identification information that is determined in S503 and that is of the network slice that the terminal is allowed to access, where the first information includes the identification information of the network slice that the terminal is rejected to access or the identification information of the network slice requested by the terminal.

In embodiments of this application, the network slice that the terminal is rejected to access may be a network slice that is in the network slice requested by the terminal and that is not supported by the TA in which the access network device is located.

In this embodiment of this application, the second information may include the identification information of the target network slice and radio resource information corresponding to the target network slice. The radio resource information corresponding to the target network slice may indicate an access frequency for accessing the target network slice. For example, the radio resource information corresponding to the target network slice may be a radio access technology (RAT)/frequency selection priority (RAT/frequency selection priority. RFSP) index corresponding to the target network slice, the RFSP index may correspondingly indicate the access frequency, and the access frequency may support the target network slice. The access frequency corresponding to the RFSP index may be pre-stored in the access network device or a policy control network element, for example, the RAN or a PCF.

Using an example in which the identification information of the network slice is the S-NSSAI, and the radio resource information corresponding to the target network slice is the RFSP index, the identification information of the network slice that the terminal is rejected to access may be the rejected NSSAI, and the identification information of the target network slice may be target NSSAI. S504 may be replaced with: The mobility management network element obtains the target NSSAI and the RFSP index based on the allowed NSSAI determined in S503 and the requested NSSAI, or obtains the target NSSAI and the RFSP index based on the allowed NSSAI and the rejected NSSAI.

In this embodiment of this application, the first information may be stored in the mobility management network element. For example, as described in S501, the first information is stored in the context of the terminal in the mobility management network element. After S503 is performed, the mobility management network element may obtain the first information from the local context, and obtain the second information based on the first information and the identification information of the network slice that the terminal is allowed to access. Optionally, the mobility management network element may delete the stored first information after obtaining the second information.

Optionally, after S503 is performed, the mobility management network element may obtain the second information in response to the first indication information based on the first information and the identification information that is determined in S503 and that is of the network slice that the terminal is allowed to access. In other words, the first indication information may serve as a trigger condition/an indication signal to trigger/indicate the mobility management network element to perform S504. As described in S501, the first indication information may exist in the locally stored context of the terminal in advance, and the mobility management network element may obtain the first indication information locally, and perform S504 in response to the first indication information. Optionally, after the second information is obtained, in other words, after S504 is performed, the mobility management network element may delete the stored first indication information.

Figure 8:
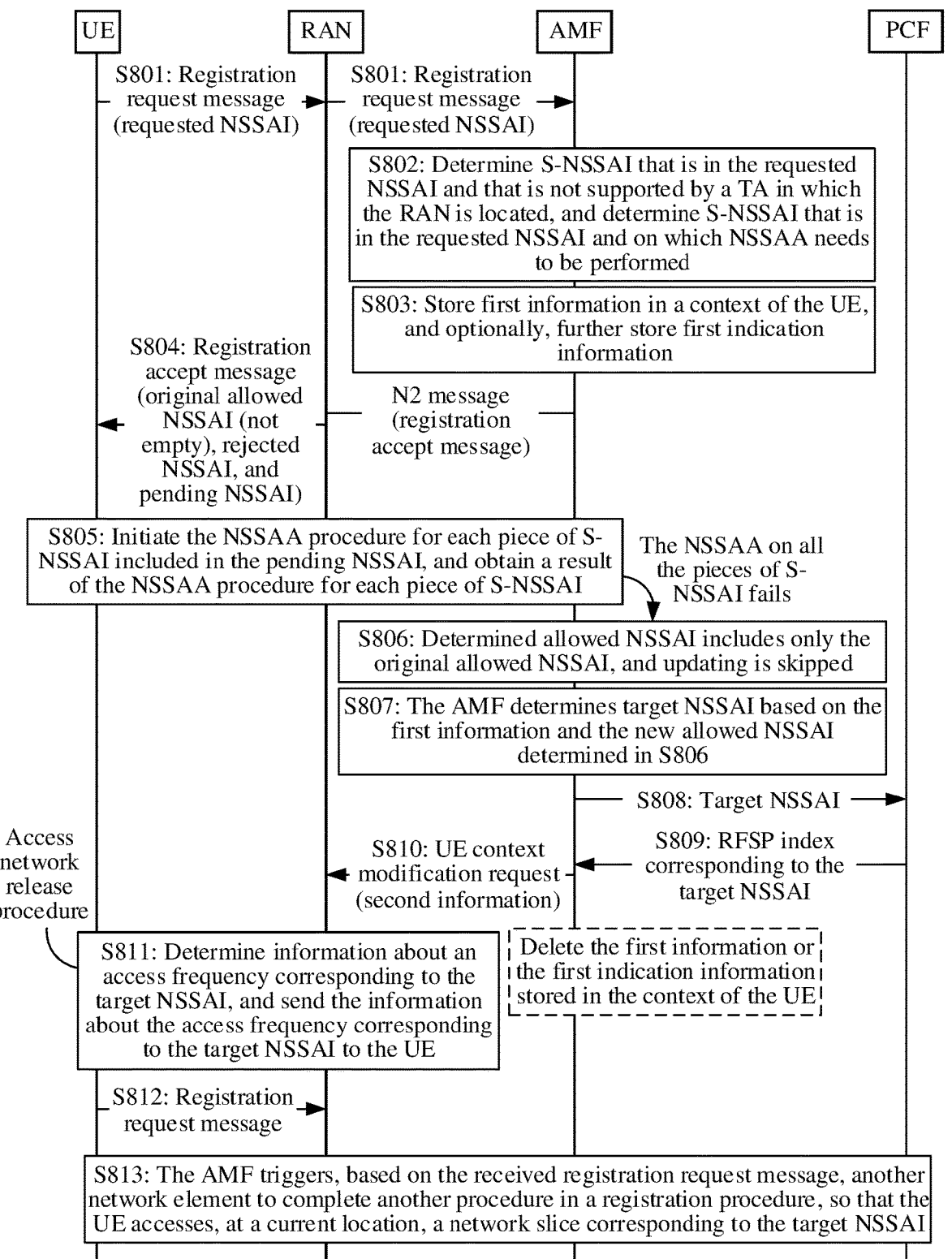
FIG. 8 is a schematic interaction diagram 3 of a tracking area selection method according to an embodiment of this application.
Figure 10:
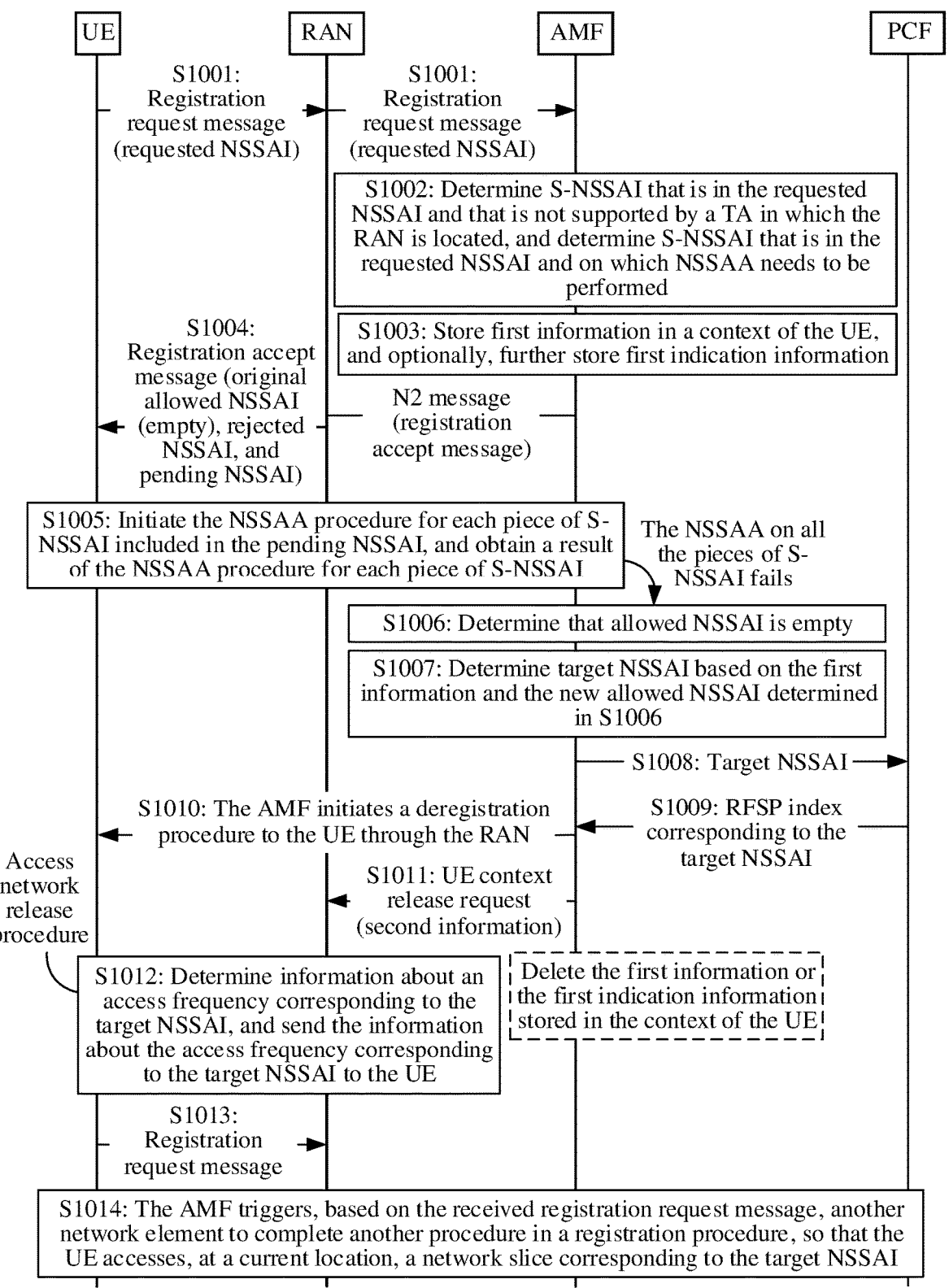
FIG. 10 is a schematic interaction diagram 5 of a tracking area selection method according to an embodiment of this application.

For example, that the mobility management network element obtains the second information based on the first information and the identification information that is determined in S503 and that is of the network slice that the terminal is allowed to access may include the following two possible designs:

In a possible design, the mobility management network element may determine the second information based on the first information and the identification information of the network slice that the terminal is allowed to access. Specifically, for this process, refer to descriptions in FIG. 6. FIG. 8, or FIG. 10.

Figure 9:
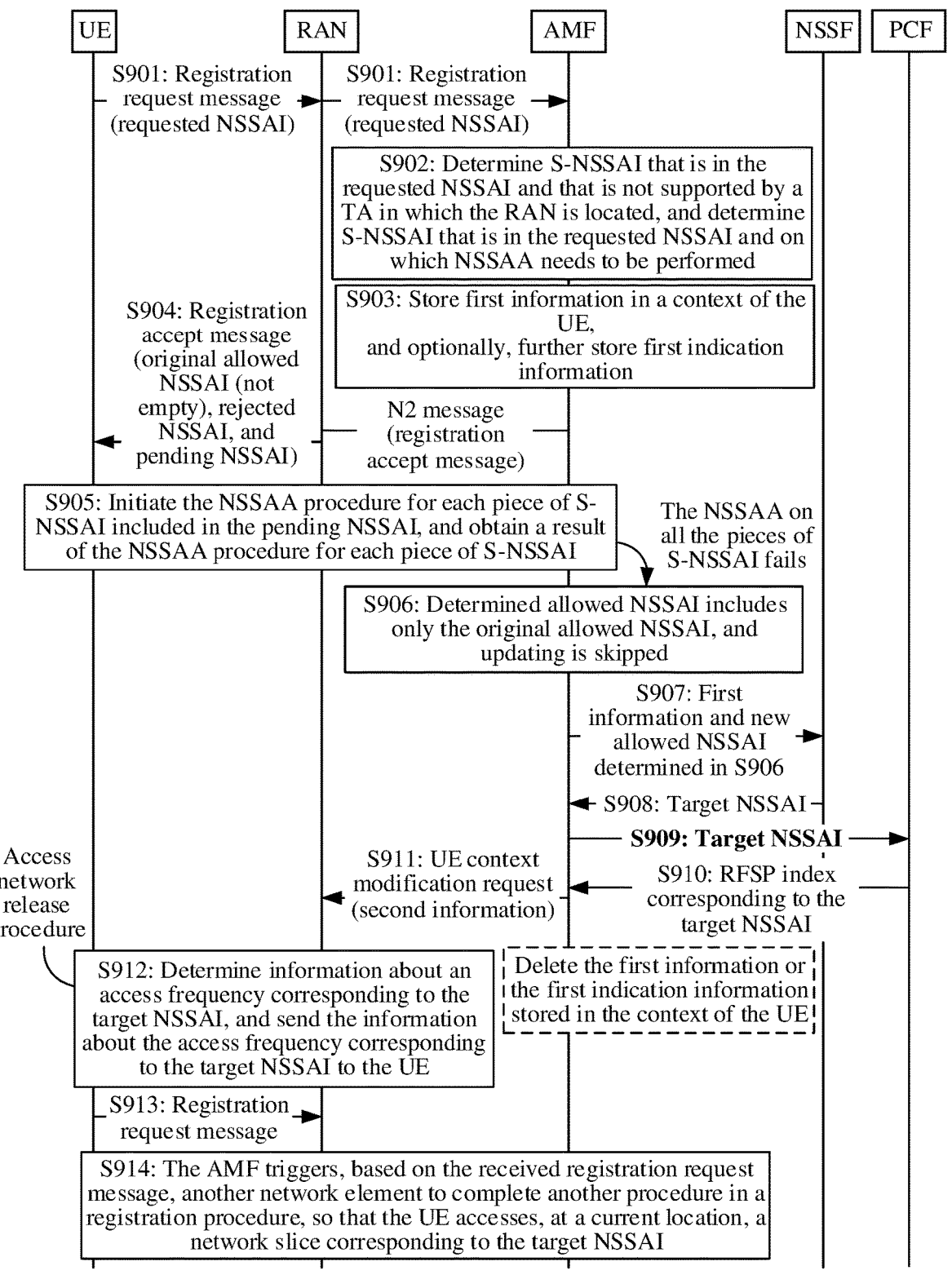
FIG. 9 is a schematic interaction diagram 4 of a tracking area selection method according to an embodiment of this application.
Figure 11A:
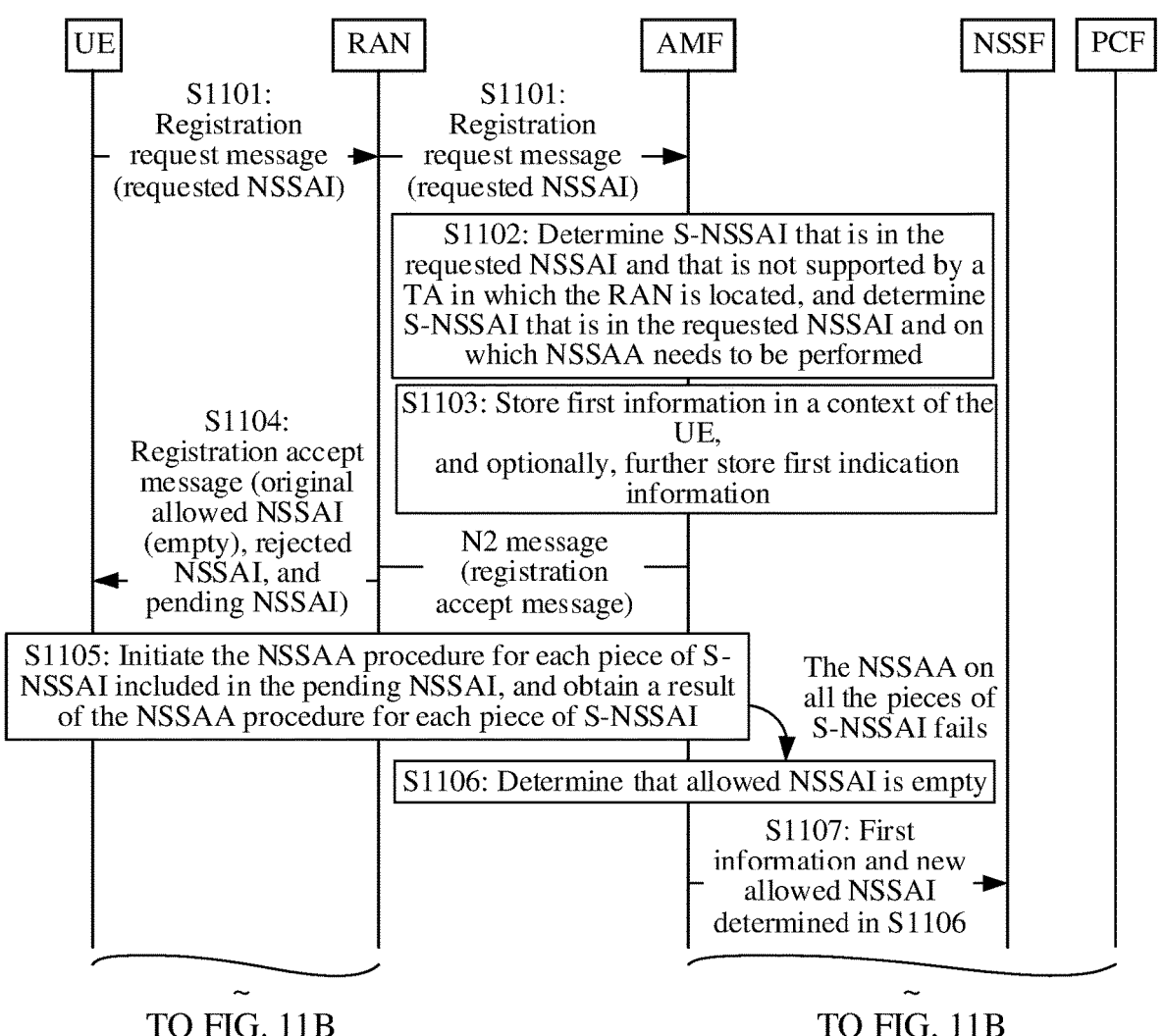
FIG. 11A and FIG. 11B are a schematic interaction diagram 6 of a tracking area selection method according to an embodiment of this application.
Figure 11B:
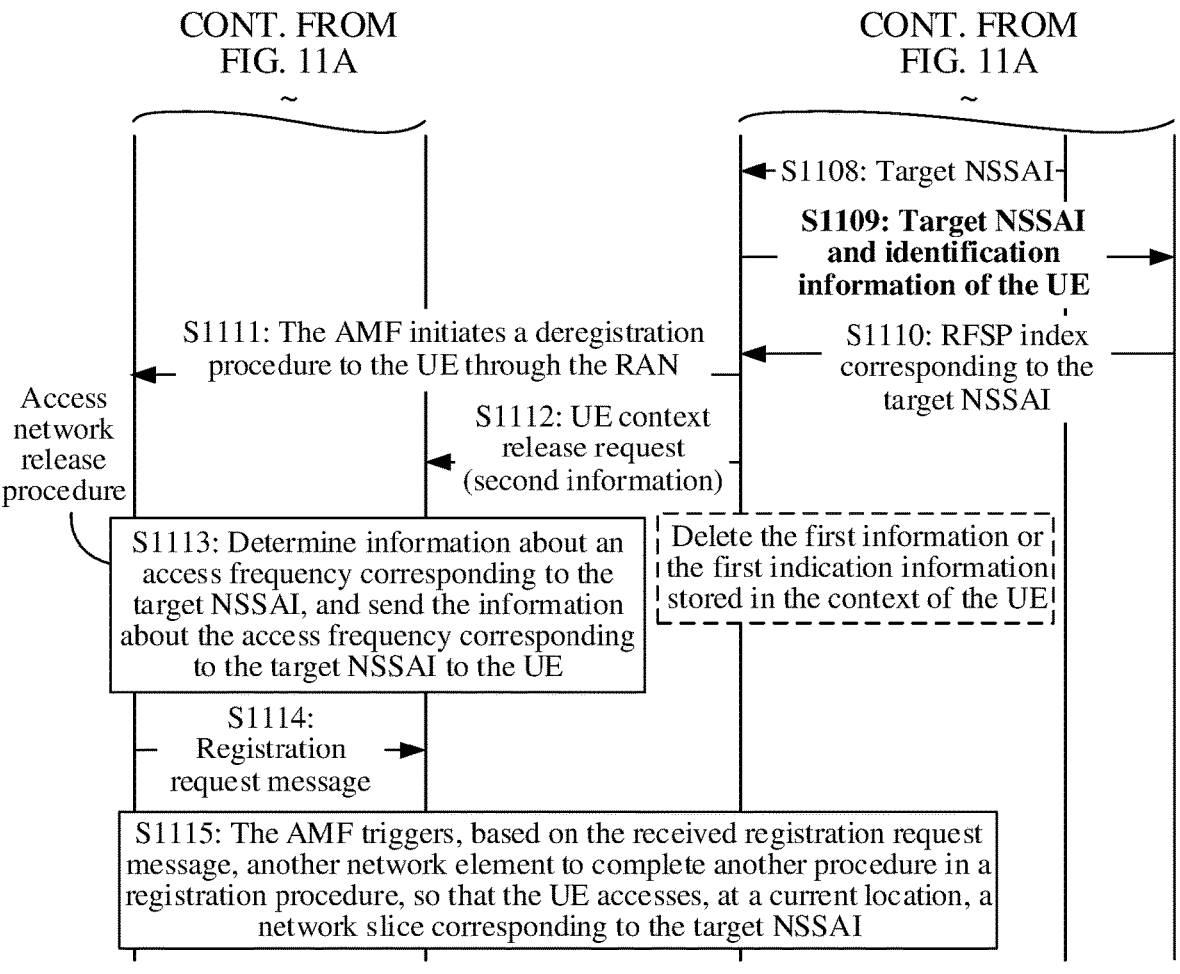

In another possible design, another network element may determine the second information based on the first information and the identification information of the network slice that the terminal is allowed to access, and feed back the determined second information to the mobility management network element. For example, the mobility management network element may send, to a network slice selection function network element, the first information and the identification information of the network slice that the terminal is allowed to access, and receive the second information from the network slice selection function network element. Specifically, for this process, refer to descriptions in FIG. 7. FIG. 9, or FIG. 11A and FIG. 11B.

S505: The mobility management network element sends the second information to the access network device. Correspondingly, the access network device receives the second information.

In a possible design, if the authentication and authorization procedure for the network slice on which authentication and authorization are to be performed succeeds, the mobility management network element initiates a UE configuration update procedure, and sends, to the access network device, a first message including a UE configuration update command and the first information. In other words, in a scenario in which the authentication and authorization succeed, the second information is sent to the access network device through the UE configuration update procedure, to reduce signaling overheads. Specifically, for this process, refer to descriptions in FIG. 6 or FIG. 7.

In another possible design, if the authentication and authorization procedure for the network slice on which authentication and authorization are to be performed is unsuccessful, and the identification information of the network slice that the terminal is allowed to access is not empty, for example, the new allowed NSSAI is not empty, and includes at least one piece of S-NSSAI, the mobility management network element sends, to the access network device, a UE context modification request carrying the second information. Specifically, for this process, refer to descriptions in FIG. 8 or FIG. 9.

In still another possible design, if the authentication and authorization procedure for the network slice on which authentication and authorization are to be performed is unsuccessful, and the identification information of the network slice that the terminal is allowed to access is empty, for example, the new allowed NSSAI is empty, and the new allowed NSSAI does not include any S-NSSAI, the mobility management network element sends, to the access network device, a UE context release request carrying the second information. Specifically, for this process, refer to descriptions in FIG. 10 or FIG. 11A and FIG. 11B.

Further, the access network device may send a radio resource control (RRC) release message to the terminal, where the RRC release message may carry the access frequency indicated by the radio resource information corresponding to the target network slice, so that the terminal selects the new TA based on the access frequency, and initiates, in a cell (where the cell may be referred to as a target cell in this application) in the new TA, a registration request message carrying the identification information of the target network slice, to successfully access the target network slice.

According to the method in FIG. 5, in a scenario in which the mobility management network element determines that the TA in which the access network device is currently located does not support S-NSSAI in the requested NSSAI, and determines that the requested NSSAI includes the S-NSSAI (for example, the pending NSSAI) on which the NSSAA needs to be performed, the mobility management network element determines the allowed NSSAI based on the result of the NSSAA on the S-NSSAI included in the pending NSSAI, then determines, based on the allowed NSSAI and the first information (the requested NSSAI or the rejected NSSAI (namely, the S-NSSAI whose rejection cause is that the current TA does not supported the S-NS-SAI)), the target NSSAI and the RFSP index corresponding to the target NSSAI, and sends the target NSSAI and the RFSP index corresponding to the target NSSAI to the access network device, to trigger the access network device to indicate the terminal to select the new TA, where the new TA supports all network slices corresponding to the target NSSAI, to ensure that the UE can successfully access the network slice through the new TA in the scenario in which the requested NSSAI includes both the S-NSSAI not supported by the current TA and the S-NSSAI on which the NSSAA needs to be performed.

With reference to the communication system shown in FIG. 3a or FIG. 3b, the tracking area selection method provided in embodiments of this application is specifically described below by assuming that identification information of a network slice requested by a terminal is requested NSSAI, identification information of a network slice that the terminal is rejected to access is rejected NSSAI, identification information of a network slice on which authentication and authorization are to be performed is pending NSSAI, identification information that is determined before an authentication and authorization procedure is performed on the pending NSSAI and that is of a network slice that the terminal is allowed to access is original allowed NSSAI, identification information that is determined based on the authentication and authorization on the pending NSSAI and that is of a network slice that the terminal is allowed to access is new allowed NSSAI, the terminal is the UE, an access network device is the RAN, and a policy control network element is the PCF. It should be understood that names of messages between the network elements, names of parameters in the messages, or the like in the following embodiments are merely examples, and may be other names in a specific implementation. This is not specifically limited in embodiments of this application.

FIG. 6 shows a tracking area selection method according to an embodiment of this application. The method includes the following steps.

S601: UE sends a registration request message to an AMF through a currently accessed RAN. Correspondingly, the AMF receives the registration request message through the RAN that is currently accessed by the UE.

The registration request message may request to perform network registration on the terminal. The registration request message may carry requested NSSAI of the terminal, and may further carry other information such as identification information of the terminal. The identification information of the terminal may identify the terminal, and may be a 5G globally unique temporary identity (5G-GUTI) of the terminal or a subscription permanent identifier (SUPI) of the terminal.

S602: The AMF determines S-NSSAI that is in the requested NSSAI and that is not supported by a TA in which the RAN is located, and determines S-NSSAI that is in the requested NSSAI and on which NSSAA needs to be performed.

Specifically, the AMF stores S-NSSAI supported by each TA. The AMF may determine, based on the locally stored S-NSSAI supported by the TA. S-NSSAI that is in the requested NSSAI and included in subscription data of the terminal but is not supported by the TA in which the RAN is located, and use, as rejected NSSAI, the S-NSSAI that is not supported by the TA in which the RAN is located. In this embodiment of this application, the S-NSSAI that is not supported by the TA in which the RAN is located may also be understood as S-NSSAI that the terminal is not allowed to access through the TA in which the RAN is located, or may be understood as S-NSSAI unavailable to the TA in which the RAN is located, where a rejection cause of the S-NSSAI is that the current TA does not support the S-NS-SAI.

In addition, the AMF may further obtain the subscription data of the UE. The subscription data of the UE may include subscribed S-NSSAI of the UE and indication information indicating whether the NSSAA needs to be performed on the S-NSSAI. The AMF may determine, based on the subscription data of the UE, whether the NSSAA needs to be performed on the S-NSSAI included in the requested NSSAI; add, to pending NSSAI. S-NSSAI that is in the requested NSSAI and included in the subscription data and on which the NSSAA needs to be performed; determine, as S-NSSAI that the UE is allowed to access. S-NSSAI that is in the requested NSSAI and included in the subscription data and on which the NSSAA does not need to be performed; and add, to allowed NSSAI, the S-NSSAI that the terminal is allowed to access. For differentiated description, in this embodiment of this application, allowed NSSAI determined by the AMF before the NSSAA procedure is referred to as original allowed NSSAI.

For example, the subscription data of the UE may be pre-stored in a UDM. The AMF may invoke a service-oriented interface Nudm subscriber data management get (Nudm_SDM_Get) of the UDM to obtain the subscription data of the UE, and the UDM sends the subscription data of the UE to the AMF through a service-oriented interface Nudm_SDM_Get response, so that the pending NSSAI and the original allowed NSSAI are determined based on the obtained subscription data of the UE.

It should be understood that, in this embodiment of this application. S-NSSAI included in the original allowed NSSAI is different from (or has no intersection with) S-NS- SAI included in the rejected NSSAI, and is different from (or has no intersection with) S-NSSAI included in the pending NSSAI.

S603: The AMF stores first information in a context of the UE.

The first information may include the rejected NSSAI or the requested NSSAI.

Optionally, the AMF further stores first indication information in the context of the UE. As described in S501, the first indication information may indicate one or more of the following: indicating to select a new TA for the terminal, where the new TA supports target NSSAI; indicating that the UE needs to be redirected to another TA or another frequency band to access a network slice; or indicating that the AMF needs to obtain the target NSSAI and a corresponding RFSP index after the NSSAA procedure is completed.

It should be understood that the storing first indication information is an optional step, and may or may not be performed. This is not limited.

S604: The AMF sends a registration accept message to the UE through the RAN. Correspondingly, the UE receives the registration accept message from the AMF through the RAN.

The registration accept message may carry the rejected NSSAI, the pending NSSAI, and the original allowed NSSAI.

Specifically, the AMF may send, to the RAN, an N2 message carrying the registration accept message. The RAN receives the N2 message, obtains the registration accept message from the N2 message, and sends the registration accept message to the UE.

S605: The AMF initiates the NSSAA procedure for each piece of S-NSSAI included in the pending NSSAI, and obtains a result of the NSSAA procedure for each piece of S-NSSAI.

Specifically, for an execution process of the NSSAA procedure, refer to a conventional technology. Details are not described.

S606: If the result of the NSSAA procedure for the S-NSSAI included in the pending NSSAI is that authentication and authorization succeed, the AMF adds, to new allowed NSSAI, the S-NSSAI that is in the pending NSSAI and on which the NSSAA is successfully performed and the original allowed NSSAI determined by the AMF in S602. This means that allowed NSSAI determined after the NSSAA procedure includes not only the allowed NSSAI determined in S603 but also the pending NSSAI whose authentication and authorization succeed.

For example, it is assumed that the requested NSSAI includes S-NSSAI-1. S-NSSAI-2, and S-NSSAI-3, and the three pieces of S-NSSAI are included in the subscribed NSSAI of the UE. If the RAN currently accessed by the UE is in a TA 1, and the TA 1 supports the S-NSSAI-1, the rejected NSSAI includes the S-NSSAI-2 and the S-NSSAI-3. In addition, it can be learned from Table 3 that the NSSAA needs to be performed on the S-NSSAI-1 supported by the TA 1. In this case, the pending NSSAI includes the S-NS-SAI-1, and the original allowed NSSAI is empty. The AMF initiates the NSSAA procedure for the S-NSSAI-1. If authentication and authorization on the S-NSSAI-1 are successfully performed, the original allowed NSSAI is updated, to add the S-NSSAI-1 to the original allowed NSSAI to obtain new allowed NSSAI. In this case, the determined new allowed NSSAI includes the S-NSSAI-1.

For another example, it is assumed that the requested NSSAI includes S-NSSAI-1. S-NSSAI-2, and S-NSSAI-3, and the three pieces of S-NSSAI are included in the subscribed NSSAI of the UE. If the RAN currently accessed by the UE is in a TA 3, and the TA 3 supports the S-NSSAI-2 and the S-NSSAI-3, the rejected NSSAI includes the S-NS-SAI-1. In addition, it can be learned from Table 3 that the NSSAA needs to be performed on the S-NSSAI-2 supported by the TA 3, and therefore the pending NSSAI includes the S-NSSAI-2; and the NSSAA does not need to be performed on the S-NSSAI-3 supported by the TA 3, and therefore the original allowed NSSAI is {S-NSSAI-3}. The AMF initiates the NSSAA procedure for the S-NSSAI-2. If authentication and authorization on the S-NSSAI-2 are successfully performed, the original allowed NSSAI is updated, to add the S-NSSAI-2 to the original allowed NSSAI to obtain new allowed NSSAI. In this case, the determined new allowed NSSAI is {S-NSSAI-2, the S-NSSAI-3}, and is different from the allowed NSSAI determined in the foregoing problem 1.

S607: The AMF determines the target NSSAI based on the first information and the new allowed NSSAI determined in S606.

Optionally, if the AMF stores the first information and the first indication information in S603, after NSSAA procedures for all pieces of S-NSSAI included in the pending NSSAI are completed, in response to the first indication information, the AMF may obtain the first information from the context of the UE, determine the target NSSAI based on the first information and the new allowed NSSAI, perform signaling exchange with a PCF, and obtain the RFSP index corresponding to the target NSSAI from the PCF.

In this embodiment of this application, the target NSSAI may include a part or all of pieces of S-NSSAI in the rejected NSSAI, or include a part or all of pieces of S-NSSAI in the rejected NSSAI and a part or all of pieces of S-NSSAI in the new allowed NSSAI. For the target NSSAI, a TA that can support all pieces of S-NSSAI included in the target NSSAI exists in a network, where the TA may be referred to as a common TA. There is a cell (where the cell may be referred to as a target cell in this application) in the common TA, and a frequency of the cell corresponds to network slices (namely, target network slices) indicated by all the pieces of S-NSSAI included in the target NSSAI. In this application, the frequency of the cell may be referred to as a common access frequency, and the terminal may access the target network slice through the frequency of the cell in the common TA. In other words, in embodiments of this application, the determined target NSSAI meets the following condition: All the network slices corresponding to the target NSSAI may be supported in a specific common TA. In this way, after the target NSSAI is determined, a network side device may determine, based on the target NSSAI, the RFSP index corresponding to the target network slice. The RFSP index corresponds to/indicates a specific access frequency (namely, the common access frequency) in the common TA corresponding to the target network slice, and the access frequency may be used by the terminal to access the target network slice.

In this embodiment of this application, a process in which the AMF determines the target NSSAI based on the first information and the new allowed NSSAI is as follows: It should be understood that the following provides descriptions by using an example in which the AMF determines the target NSSAI. For a process in which another network element (for example, an NSSF) determines the target NSSAI based on the first information and the new allowed NSSAI, refer to the following descriptions.

In an example, the first information includes the requested NSSAI, and that the AMF determines the target NSSAI based on the first information and the new allowed NSSAI may include either of the following two implementations:

Manner 1: The AMF determines, from the requested NSSAI based on a status of NSSAI supported by the current TA, the NSSAI not supported by the current TA (namely, the rejected NSSAI), and determines, based on the S-NSSAI supported by each TA deployed in the network, specific S-NSSAI in the rejected NSSAI and specific S-NSSAI in the new allowed NSSAI that are included in the target NSSAI. Details are as follows:

(1) The target NSSAI includes the part or all of the pieces of S-NSSAI in the rejected NSSAI, and does not include the S-NSSAI included in the new allowed NSSAI.

For example, if there is one TA in a TA list, and the TA supports the part of the pieces of S-NSSAI in the rejected NSSAI, but does not support any piece of S-NSSAI included in the allowed NSSAI, the target NSSAI includes the part of the pieces of S-NSSAI in the rejected NSSAI. Alternatively, if the TA supports all the pieces of S-NSSAI in the rejected NSSAI, but does not support any piece of S-NSSAI included in the allowed NSSAI, the target NSSAI includes all the pieces of S-NSSAI in the rejected NSSAI.

For another example, if the rejected NSSAI includes K pieces of S-NSSAI, where K is an integer greater than or equal to 1, the K pieces of S-NSSAI are respectively supported by different TAs, in other words, no common TA supports all the K pieces of S-NSSAI included in the rejected NSSAI, and network slices indicated by the S-NSSAI included in the rejected NSSAI are deployed in different TAs, the AMF may select one piece of S-NSSAI from the rejected NSSAI as the target NSSAI according to a local policy.

The local policy may include at least one of the following: selecting S-NSSAI with a highest priority or selecting S-NSSAI with minimum load. In an implementation, the AMF may obtain priority information of the S-NSSAI from the subscription data of the terminal or another network element.

The foregoing process may be understood as follows: A TA that supports the S-NSSAI included in the rejected NSSAI is different from a TA that supports the S-NSSAI included in the allowed NSSAI, and it cannot be ensured that the terminal accesses both the rejected NSSAI and the allowed NSSAI through one TA. However, there is a TA, where the terminal can access a part or all of the pieces of S-NSSAI in the rejected NSSAI through a cell in the TA. The terminal camps on the cell in the TA, and may request, through a specific access frequency, to access the part or all of the pieces of S-NSSAI in the rejected NSSAI.

It should be understood that a deployment location of the TA (where the TA may be referred to as a target TA or a new TA in this application) that supports all the pieces of S-NSSAI included in the target NSSAI is not limited in embodiments of this application. The deployment location of the TA may or may not overlap a deployment location of the TA (namely, the current TA) in which the access network device currently accessed by the terminal is located. When the deployment location of the target TA overlaps the deployment location of the current TA, and the common access frequency corresponding to the target NSSAI corresponds to a specific target cell in an overlapping area, it means that the terminal may access, through the target cell in the current overlapping area, the target network slice corresponding to the target NSSAI.

(2) The target NSSAI includes the part or all of the pieces of S-NSSAI in the rejected NSSAI, and includes the part or all of the pieces of S-NSSAI in the new allowed NSSAI.

For example, if the AMF determines, based on a locally stored TA list and a network slice supported by each TA, that a TA that can support the part or all of the pieces of S-NSSAI in the rejected NSSAI and can further support the part or all of the pieces of S-NSSAI included in the allowed NSSAI exists in the network, the target NSSAI may include the part or all of the pieces of S-NSSAI in the rejected NSSAI and the part or all of the pieces of S-NSSAI in the allowed NSSAI.

The foregoing process may be understood as: There is a TA in the network, where the terminal may access, through a cell in the TA, the part or all of the pieces of S-NSSAI in the rejected NSSAI and the part or all of the pieces of S-NSSAI included in the allowed NSSAI. If the terminal camps on the cell in the TA, the terminal may request, through a specific frequency, to access the part or all of the pieces of S-NSSAI in the rejected NSSAI and the part or all of the pieces of S-NSSAI included in the allowed NSSAI.

It should be understood that "include" in embodiments of this application may be understood as "contain" or "carry". The several words have a same meaning, and may be used interchangeably. This is not limited.

(3) Specific S-NSSAI included in the target NSSAI is determined based on S-NSSAI associated with a session of the terminal.

For example, if the terminal currently establishes a session (for example, a protocol data unit (PDU) session) of the terminal, and S-NSSAI associated with the session is included in the allowed NSSAI, to ensure service continuity of the session of the terminal, the AMF may determine whether a TA that supports the S-NSSAI that is in the allowed NSSAI and that is associated with the session of the terminal exists. If the TA exists, the AMF determines whether the TA also supports a part or all of the pieces of S-NSSAI in the rejected NSSAI. If the TA also supports the part or all of the pieces of S-NSSAI in the rejected NSSAI, it means that the terminal may access, through a cell in the TA, the part or all of the pieces of S-NSSAI in the rejected NSSAI and the S-NSSAI that is in the allowed NSSAI and that is associated with the session of the terminal. In this case, the target NSSAI may include the part or all of the pieces of S-NSSAI in the rejected NSSAI and the S-NSSAI that is in the allowed NSSAI and that is associated with the session of the terminal. Optionally, the terminal may further access, through the cell in the TA, other S-NSSAI that is in the allowed NSSAI and that is supported by the TA. Correspondingly, the target NSSAI may further include the other S-NSSAI that is in the allowed NSSAI and that is supported by the TA.

Manner 2: The first information includes the requested NSSAI, and the AMF determines the requested NSSAI as the target NSSAI.

For example, the AMF determines, based on a locally stored TA list and a network slice supported by each TA, that a TA that can support all pieces of S-NSSAI included in the requested NSSAI exists. In this case, the AMF may directly determine the requested NSSAI as the target NSSAI.

In another example, the first information includes the rejected NSSAI. That the AMF determines the target NSSAI based on the first information and the new allowed NSSAI may include: The AMF determines the target NSSAI based on the rejected NSSAI and the new allowed NSSAI. Specifically, for this process, refer to the descriptions in the foregoing manner 1. Details are not described again.

It should be understood that, in addition to the foregoing manner, the mobility management network element may alternatively determine, in another manner, specific S-NS- SAI included in the target NSSAI. This is not limited in this application.

For example, it is assumed that the new allowed NSSAI includes {S-NSSAI-1, S-NSSAI-2}, and the rejected NSSAI includes S-NSSAI-3. As shown in Table 2, the TA 1, the TA 2, and the TA 3 support the S-NSSAI-3, the TA 1 and the TA 2 support the S-NSSAI-1, and the TA 2 and the TA 3 support the S-NSSAI-2. The TA 2 supports the S-NSSAI-3, the S-NSSAI-1, and the S-NSSAI-2, and an access frequency 1 of a cell in the TA 2 can completely cover network slices corresponding to the S-NSSAI-1, the S-NSSAI-2, and the S-NSSAI-3/support the UE in accessing network slices corresponding to the S-NSSAI-1, the S-NSSAI-2, and the S-NSSAI-3. In this case, the target NSSAI is determined as {S-NSSAI-1, the S-NSSAI-2, the S-NSSAI-3}.

S608: The AMF sends the target NSSAI to the PCF. Correspondingly, the PCF receives the target NSSAI from the AMF.

For example, the AMF may invoke a service-oriented operation of the PCF: a service-oriented interface Npcf_ac- cess management policy control update request (Npcf_AM- PolicyControl_Update request), to send the Npcf_AMPoli- cyControl_Update request including the target NSSAI to the PCF.

Optionally, the AMF further sends the identification infor- mation of the UE and other information to the PCF. This is not limited.

S609: The PCF determines, based on the target NSSAI, the RFSP index corresponding to the target NSSAI, and sends the RFSP index corresponding to the target NSSAI to the AMF. Correspondingly, the AMF receives the RFSP index corresponding to the target NSSAI from the PCF.

Specifically, the PCF locally configures a correspondence between S-NSSAI and an RFSP index, and determines, based on the target NSSAI and the correspondence between S-NSSAI and an RFSP index, the RFSP index corresponding to the target NSSAI.

For example, the PCF invokes a service-oriented opera- tion of the PCF: a service-oriented interface Npcf_access management policy control update response (Npcf_AMPoli- cyControl_Update response), to send the Npcf_AMPolicy- Control_Update response including the RFSP index corre- sponding to the target NSSAI to the AMF.

The allowed NSSAI is updated because the pending NSSAI includes the S-NSSAI on which the NSSAA is successfully performed. Therefore, the AMF needs to send the new allowed NSSAI to the UE using a UE configuration update procedure. In the UE configuration update procedure, the target NSSAI and the RFSP index corresponding to the target NSSAI may be sent to the RAN, to reduce signaling overheads. Specifically, this process is described in S610 and S611.

Optionally, after determining the target NSSAI and the RFSP index corresponding to the target NSSAI, the AMF may delete the first information stored in the context of the UE. In addition, if the AMF further stores the first indication information in S603, the AMF may further delete the first indication information after determining the target NSSAI and the RFSP index corresponding to the target NSSAI.

S610: The AMF sends a first message to the RAN, where the first message carries a UE configuration update com- mand and second information {target NSSAI. RFSP index corresponding to the target NSSAI}. Correspondingly, the RAN receives the first message from the AMF.

The first message may be an N2 message. The UE configuration update command may carry the new allowed NSSAI, and may indicate to update a related configuration of the UE, for example, update the allowed NSSAI of the UE.

S611: The RAN sends the UE configuration update com- mand to the UE. Correspondingly, the UE receives the UE configuration update command.

S612: The RAN determines, based on the target NSSAI and the RFSP index corresponding to the target NSSAI, information about the access frequency corresponding to the target NSSAI, and sends the information about the access frequency corresponding to the target NSSAI to the UE. Correspondingly, the UE receives the information about the access frequency corresponding to the target NSSAI.

In an implementation, the information about the access frequency corresponding to the target NSSAI may indicate the access frequency corresponding to the target NSSAI, and may be used by the UE to select the target cell. The target cell may support access to all the network slices correspond- ing to the target NSSAI. Specifically, the information about the access frequency corresponding to the target NSSAI may be an index of the access frequency corresponding to the target NSSAI, and the UE may access, through the access frequency, all the network slices corresponding to the target NSSAI. For example, if the access frequency corresponding to the target NSSAI is F1, the information about the access frequency corresponding to the target NSSAI includes F1.

Specifically, the RAN locally configures a correspon- dence between a subscriber profile identifier (subscriber profile ID, SPID) for a RAT/frequency selection priority (SPID for a RAT/frequency selection priority) and frequency band priority list information or a correspondence between an RFSP index and frequency band priority list information. The correspondence may be enumerated in Table 4. The RAN may determine, based on the RFSP index carried in the first message and the correspondence, frequency band pri- ority list information corresponding to the RFSP index corresponding to the target NSSAI, and select, from the determined frequency band priority list information, the access frequency corresponding to the target NSSAI.

TABLE 4

| RFSP index | Frequency band priority list information |
|---|---|
| RFSP index-1 | Access frequency 1 |
| RFSP index-2 | Access frequency 2 |
| RFSP index-2 | Access frequency 3 |

It should be understood that in this application, the frequency band priority list information may also be referred to as frequency band information, a frequency band list, frequency band priority information, a frequency band pri- ority list, frequency information, a frequency list, frequency priority information, a frequency priority list, frequency information, a frequency list, frequency priority informa- tion, or a frequency priority list. It should be noted that, in this application, the SPID on a wireless side and the RFSP index on a core network side are a same concept. In this application, for consistency, both the SPID on the wireless side and the RFSP index on the core network side are referred to as the RFSP index.

It should be understood that the access frequency described in embodiments of this application may also be understood as a frequency band or an access frequency band. This is not limited.

For example, the RAN may send the information about the access frequency corresponding to the target NSSAI to the UE through an access network release (AN release) procedure. For example, the RAN may send a radio resource control (RRC) release message to the UE. The RRC release message may indicate the UE to release a connection to the current cell and select a new cell, and may carry the information about the access frequency corresponding to the target NSSAI.

S613: The UE selects the target cell based on the information about the access frequency corresponding to the target NSSAI, and initiates a registration update procedure to the target cell. For example, after the UE receives, from the RAN in S612, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request message may further include other information such as the identification information of the UE in addition to the requested NSSAI.

S614: The AMF triggers, based on the received registration request message, another network element to complete another procedure in a registration procedure, so that the UE accesses, at a current location, the network slice corresponding to the target NSSAI.

Specifically, for this process, refer to a conventional technology. Details are not described.

According to the method in FIG. 6, in a scenario in which the AMF determines that the TA in which the RAN is currently located does not support the S-NSSAI in the requested NSSAI, and determines that the requested NSSAI includes the S-NSSAI (for example, the pending NSSAI) on which the NSSAA needs to be performed, after the NSSAA procedure is performed on all the pieces of S-NSSAI included in the pending NSSAI and when the NSSAA on the S-NSSAI is successfully performed, the AMF determines the target NSSAI based on the new allowed NSSAI and the first information (the requested NSSAI or the rejected NSSAI), obtains the RFSP index corresponding to the target NSSAI from the PCF, and sends the target NSSAI and the RFSP index corresponding to the target NSSAI to the RAN, to trigger the RAN to indicate the UE to select the new TA, where the new TA can support all the network slices corresponding to the target NSSAI, to ensure that the UE can successfully access the network slice in the scenario in which the requested NSSAI includes both the S-NSSAI not supported by the current TA and the S-NSSAI on which the NSSAA needs to be performed.

In the method in FIG. 6, the AMF determines the target NSSAI, and interacts with the PCF to obtain the RFSP index corresponding to the target NSSAI. Alternatively, another network element may determine the target NSSAI, interact with the PCF to obtain the RFSP index corresponding to the target NSSAI, and send the target NSSAI and the RFSP index corresponding to the target NSSAI to the AMF. Specifically, for this method, refer to descriptions in FIG. 7. An execution process of S701 to S706 in FIG. 7 is the same as that of S601 to S606 in FIG. 6, an execution process of S709 to S715 is the same as that of S608 to S614 in FIG. 6, and S707 and S708 may be used as a replacement method for S607.

FIG. 7 shows still another tracking area selection method according to an embodiment of this application. As shown in FIG. 7, the method may include the following steps.

S701: UE sends a registration request message to an AMF through a currently accessed RAN. Correspondingly, the AMF receives the registration request message through the RAN that is currently accessed by the UE.

Specifically, related descriptions of the registration request message and an execution process of S701 are the same as those in S601, and details are not described again.

S702: The AMF determines S-NSSAI that is in the requested NSSAI and that is not supported by a TA in which the RAN is located, and determines S-NSSAI that is in the requested NSSAI and on which NSSAA needs to be performed.

Specifically, S702 is the same as S602, and details are not described again.

S703: The AMF stores first information in a context of the UE.

Optionally, the AMF further stores first indication information in the context of the UE.

Specifically, related descriptions of the first indication information and an execution process of S703 are the same as those in S603. Details are not described again.

S704: The AMF sends a registration accept message to the UE through the RAN. Correspondingly, the UE receives the registration accept message from the AMF through the RAN.

Specifically, S704 is the same as S604, and details are not described again.

S705: The AMF initiates the NSSAA procedure for each piece of S-NSSAI included in the pending NSSAI, and obtains a result of the NSSAA procedure for each piece of S-NSSAI.

Specifically, for an execution process of the NSSAA procedure, refer to a conventional technology. Details are not described.

S706: If the result of the NSSAA procedure for the S-NSSAI included in the pending NSSAI is that authentication and authorization succeed, the AMF adds, to new allowed NSSAI, the S-NSSAI that is in the pending NSSAI and on which the NSSAA is successfully performed and the original allowed NSSAI determined by the AMF in S702. This means that allowed NSSAI determined after the NSSAA procedure includes not only the allowed NSSAI (namely, the original allowed NSSAI) determined in S703 but also the S-NSSAI that is in the pending NSSAI and whose authentication and authorization succeed.

Specifically. S706 is the same as S606, and details are not described again.

S707: The AMF sends the first information and the new allowed NSSAI determined in S706 to an NSSF. Correspondingly, the NSSF receives the first information and the new allowed NSSAI determined in S706, and determines the target NSSAI based on the first information and the new allowed NSSAI determined in S706.

Specifically, the AMF may invoke a service-oriented operation of the NSSF: a service-oriented interface Nnssf_network slice selection_get (Nnssf_NSSelection-_Get) to send the first information and the new allowed NSSAI determined in S706 to the NSSF. Optionally, the AMF further sends, to the NSSF, indication information indicating the NSSF to determine the target NSSAI, so that the NSSF determines the target NSSAI in response to the indication information based on the first information and the new allowed NSSAI determined in S706.

It should be understood that if the AMF stores the first information and the first indication information in S703, after NSSAA procedures for all pieces of S-NSSAI included in the pending NSSAI are completed, in response to the first indication information, the AMF may obtain the first information from the context of the UE, and send the first information and the new allowed NSSAI determined in S706 to the NSSF.

A process in which the NSSF determines the target NSSAI is the same as the process in which the AMF determines the target NSSAI. Details are not described again.

S708: The NSSF sends the target NSSAI to the AMF. Correspondingly, the AMF receives the target NSSAI.

Specifically, the NSSF invokes a service-oriented operation of the NSSF: a service-oriented interface Nnssf_network slice selection_get response (Nnssf_NSSelection_Get response) to return the target NSSAI to the AMF.

S709: The AMF sends the target NSSAI to a PCF. Correspondingly, the PCF receives the target NSSAI from the AMF.

Specifically. S709 is the same as S608, and details are not described again.

S710: The PCF determines, based on the target NSSAI, an RFSP index corresponding to the target NSSAI, and sends the RFSP index corresponding to the target NSSAI to the AMF. Correspondingly, the AMF receives the RFSP index corresponding to the target NSSAI from the PCF.

Specifically. S710 is the same as S609, and details are not described again.

Optionally, after obtaining the target NSSAI and the RFSP index corresponding to the target NSSAI, the AMF may delete the first information stored in the context of the UE. In addition, if the AMF further stores the first indication information in S703, the AMF may further delete the first indication information after obtaining the target NSSAI and the RFSP index corresponding to the target NSSAI.

The allowed NSSAI is updated because the pending NSSAI includes the S-NSSAI on which the NSSAA is successfully performed. Therefore, the AMF needs to send the new allowed NSSAI to the UE using a UE configuration update procedure. In the UE configuration update procedure, the target NSSAI and the RFSP index corresponding to the target NSSAI may be sent to the RAN, to reduce signaling overheads. Specifically, this process is described in S711 and S712.

S711: The AMF sends a first message to the RAN, where the first message carries a UE configuration update command and second information {target NSSAI, the RFSP index corresponding to the target NSSAI}. Correspondingly, the RAN receives the first message from the AMF.

Specifically, S711 is the same as S610, and details are not described again.

S712: The RAN sends the UE configuration update command to the UE. Correspondingly, the UE receives the UE configuration update command.

S713: The RAN determines, based on the target NSSAI and the RFSP index corresponding to the target NSSAI, information about an access frequency corresponding to the target NSSAI, and sends the information about the access frequency corresponding to the target NSSAI to the UE. Correspondingly, the UE receives the information about the access frequency corresponding to the target NSSAI.

Specifically, S713 is the same as S612, and details are not described again.

S714: The UE selects the target cell based on the information about the access frequency corresponding to the target NSSAI, and initiates a registration update procedure to the target cell. For example, after the UE receives, from the RAN in S713, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request message may further include other information such as the identification information of the UE in addition to the requested NSSAI.

S715: The AMF triggers, based on the received registration request message, another network element to complete another procedure in a registration procedure, so that the UE accesses, at a current location, the network slice corresponding to the target NSSAI.

Specifically, for this process, refer to a conventional technology. Details are not described.

According to the method in FIG. 7, in a scenario in which the AMF determines that the TA in which the RAN is currently located does not support the S-NSSAI in the requested NSSAI, and determines that the requested NSSAI includes the S-NSSAI (for example, the pending NSSAI) on which the NSSAA needs to be performed, after the NSSAA procedure is performed on all the pieces of S-NSSAI included in the pending NSSAI and when the NSSAA on the S-NSSAI is successfully performed, the AMF obtains the target NSSAI from the NSSF based on the new allowed NSSAI and the first information (the requested NSSAI or the rejected NSSAI), obtains the RFSP index corresponding to the target NSSAI from the PCF, and sends the target NSSAI and the RFSP index corresponding to the target NSSAI to the RAN, to trigger the RAN to indicate the UE to select the new TA, where the new TA can support all the network slices corresponding to the target NSSAI, to ensure that the UE can successfully access the network slice in the scenario in which the requested NSSAI includes both the S-NSSAI not supported by the current TA and the S-NSSAI on which the NSSAA needs to be performed.

In the method shown in FIG. 6 or FIG. 7, with reference to the scenario in which the TA in which the RAN is currently located does not support the S-NSSAI in the requested NSSAI and the requested NSSAI includes the S-NSSAI (for example, the pending NSSAI) on which the NSSAA needs to be performed, the tracking area selection method is described by using an example in which the NSSAA on the S-NSSAI included in the pending NSSAI is successfully performed. The following describes a case in which NSSAA on all the pieces of S-NSSAI included in the pending NSSAI fails.

FIG. 8 shows still another tracking area selection method according to an embodiment of this application. As shown in FIG. 8, the method may include the following steps.

S801: UE sends a registration request message to an AMF through a currently accessed RAN. Correspondingly, the AMF receives the registration request message through the RAN that is currently accessed by the UE.

Specifically, related descriptions of the registration request message and an execution process of S801 are the same as those in S601, and details are not described again.

S802: The AMF determines S-NSSAI that is in the requested NSSAI and that is not supported by a TA in which the RAN is located, and determines S-NSSAI that is in the requested NSSAI and on which NSSAA needs to be performed.

Specifically, S802 is the same as S602, and details are not described again.

S803: The AMF stores first information in a context of the UE.

Optionally, the AMF further stores first indication information in the context of the UE.

Specifically, related descriptions of the first indication information and an execution process of S803 are the same as those in S603. Details are not described again.

S804: The AMF sends a registration accept message to the UE through the RAN. Correspondingly, the UE receives the registration accept message from the AMF through the RAN.

Specifically, S804 is the same as S604, and details are not described again.

S805: The AMF initiates the NSSAA procedure for each piece of S-NSSAI included in the pending NSSAI, and obtains a result of the NSSAA procedure for each piece of S-NSSAI.

Specifically, for an execution process of the NSSAA procedure, refer to a conventional technology. Details are not described.

S806: If the results of the NSSAA procedures for all the pieces of S-NSSAI included in the pending NSSAI are that authentication and authorization fail, the AMF skips updating the original allowed NSSAI determined by the AMF in S802. This means that allowed NSSAI determined after the NSSAA procedure includes only the allowed NSSAI determined in S803 (namely, the original allowed NSSAI), and the new allowed NSSAI is the same as the original allowed NSSAI.

Specifically, S806 is the same as S606, and details are not described again.

It should be noted that, in this embodiment shown in FIG. 8, the original allowed NSSAI is not empty, in other words, the original allowed NSSAI includes at least one piece of S-NSSAI.

For example, it is assumed that the requested NSSAI includes S-NSSAI-1, S-NSSAI-2, and S-NSSAI-3, and the three pieces of S-NSSAI are included in the subscribed NSSAI of the UE. If the RAN currently accessed by the UE is in a TA 3, and the TA 3 supports the S-NSSAI-2 and the S-NSSAI-3, the rejected NSSAI includes the S-NSSAI-1. In addition, it can be learned from Table 3 that the NSSAA needs to be performed on the S-NSSAI-2 supported by the TA 3, and therefore the pending NSSAI includes the S-NS-SAI-2; and the NSSAA does not need to be performed on the S-NSSAI-3 supported by the TA 3, and therefore the original allowed NSSAI is {S-NSSAI-3}. The AMF initiates the NSSAA procedure for the S-NSSAI-2. If the NSSAA on the S-NSSAI-2 fails, the original allowed NSSAI is not updated. In this case, the new allowed NSSAI that is determined is {S-NSSAI-3}, and is the same as the original allowed NSSAI.

S807: The AMF determines the target NSSAI based on the first information and the new allowed NSSAI determined in S806.

Specifically, for descriptions of S807, refer to S607. It should be understood that, because the NSSAA procedure for the pending NSSAI in S806 fails, the new allowed NSSAI is the same as the original allowed NSSAI, in other words, the allowed NSSAI determined before the NSSAA procedure is not updated. S807 may be understood as determining the target NSSAI based on the first information and the original allowed NSSAI. Details are not described again.

It should be understood that if the AMF stores the first information and the first indication information in S803, after NSSAA procedures for all pieces of S-NSSAI included in the pending NSSAI are completed, in response to the first indication information, the AMF may obtain the first information from the context of the UE, and determine the target NSSAI based on the first information and the original allowed NSSAI.

S808: The AMF sends the target NSSAI to the PCF. Correspondingly, the PCF receives the target NSSAI from the AMF.

Specifically, S808 is the same as S608, and details are not described again.

S809: The PCF determines, based on the target NSSAI, the RFSP index corresponding to the target NSSAI, and sends the RFSP index corresponding to the target NSSAI to the AMF. Correspondingly, the AMF receives the RFSP index corresponding to the target NSSAI from the PCF.

Specifically, S809 is the same as S609, and details are not described again.

Optionally, after determining the target NSSAI and obtaining the RFSP index corresponding to the target NSSAI, the AMF may delete the first information stored in the context of the UE. In addition, if the AMF further stores the first indication information in S703, the AMF may further delete the first indication information after determining the target NSSAI and obtaining the RFSP index corresponding to the target NSSAI.

Because the NSSAA on all the pieces of S-NSSAI in the pending NSSAI fails, the allowed NSSAI is not updated, and is the original allowed NSSAI. Because the original allowed NSSAI has been carried in the registration accept message to be sent to the UE, the AMF does not need to send the new allowed NSSAI to the UE using a UE configuration update procedure. Instead, the AMF initiates a UE context modification request to update an access frequency of the UE. Specifically, this process is described in S810.

S810: The AMF sends the UE context modification request to the RAN, where the UE context modification request carries second information {target NSSAI, the RFSP index corresponding to the target NSSAI}. Correspondingly, the RAN receives the UE context modification request from the AMF.

The UE context modification request may request to update the context of the UE stored in the RAN, for example, update the access frequency of the UE in the context of the UE. The UE context modification request may further carry other information such as the identification information of the UE in addition to the second information. This is not limited.

S811: The RAN determines, based on the target NSSAI and the RFSP index corresponding to the target NSSAI, information about the access frequency corresponding to the target NSSAI, and sends the information about the access frequency corresponding to the target NSSAI to the UE. Correspondingly, the UE receives the information about the access frequency corresponding to the target NSSAI.

Specifically, S811 is the same as S612, and details are not described again.

S812: The UE selects the target cell based on the information about the access frequency corresponding to the target NSSAI, and initiates a registration update procedure to the target cell. For example, after the UE receives, from the RAN in S811, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request message may further include other information such as the identification information of the UE in addition to the requested NSSAI.

S813: The AMF triggers, based on the received registration request message, another network element to complete another procedure in a registration procedure, so that the UE accesses, at a current location, the network slice corresponding to the target NSSAI.

Specifically, for this process, refer to a conventional technology. Details are not described.

According to the method shown in FIG. 8, in a scenario in which the AMF determines that the TA in which the RAN is currently located does not support the S-NSSAI in the requested NSSAI, and determines that the requested NSSAI includes the S-NSSAI (for example, the pending NSSAI) on which the NSSAA needs to be performed, if the NSSAA on all the pieces of S-NSSAI included in the pending NSSAI fails, the original allowed NSSAI is not updated, and the obtained new allowed NSSAI is the same as the original allowed NSSAI. Further, the target NSSAI is obtained from the NSSF based on the new allowed NSSAI (where the new allowed NSSAI may be understood as the original allowed NSSAI) and the first information (the requested NSSAI or the rejected NSSAI), the RFSP index corresponding to the target NSSAI is obtained from the PCF, and the target NSSAI and the RFSP index corresponding to the target NSSAI are sent to the RAN, to trigger the RAN to indicate the UE to select the new TA/new cell for access, where the new TA/cell can support all the network slices corresponding to the target NSSAI, to ensure that the UE can successfully access the network slice in the scenario in which the requested NSSAI includes both the S-NSSAI not supported by the current TA and the S-NSSAI on which the NSSAA needs to be performed.

The process in which when the NSSAA on all the pieces of S-NSSAI included in the pending NSSAI fails, the AMF determines the target NSSAI and interacts with the PCF to obtain the RFSP index corresponding to the target NSSAI is described in the method in FIG. 8. Alternatively, another network element may determine the target NSSAI, interact with the PCF to obtain the RFSP index corresponding to the target NSSAI, and send the target NSSAI and the RFSP index corresponding to the target NSSAI to the AMF. Specifically, for this method, refer to descriptions in FIG. 9.

FIG. 9 shows still another tracking area selection method according to an embodiment of this application. As shown in FIG. 9, the method may include the following steps.

S901: UE sends a registration request message to an AMF through a currently accessed RAN. Correspondingly, the AMF receives the registration request message through the RAN that is currently accessed by the UE.

Specifically, related descriptions of the registration request message and an execution process of S901 are the same as those in S601, and details are not described again.

S902: The AMF determines S-NSSAI that is in the requested NSSAI and that is not supported by a TA in which the RAN is located, and determines S-NSSAI that is in the requested NSSAI and on which NSSAA needs to be performed.

Specifically. S902 is the same as S602, and details are not described again.

S903: The AMF stores first information in a context of the UE.

Optionally, the AMF further stores first indication information in the context of the UE.

Specifically, related descriptions of the first indication information and an execution process of S903 are the same as those in S603. Details are not described again.

S904: The AMF sends a registration accept message to the UE through the RAN. Correspondingly, the UE receives the registration accept message from the AMF through the RAN.

Specifically, S904 is the same as S604, and details are not described again.

S905: The AMF initiates the NSSAA procedure for each piece of S-NSSAI included in the pending NSSAI, and obtains a result of the NSSAA procedure for each piece of S-NSSAI.

Specifically, for an execution process of the NSSAA procedure, refer to a conventional technology. Details are not described.

S906: If the results of the NSSAA procedures for all the pieces of S-NSSAI included in the pending NSSAI are that authentication and authorization fail, the AMF skips updating the original allowed NSSAI determined by the AMF in S902. This means that allowed NSSAI determined after the NSSAA procedure includes only the allowed NSSAI determined in S903 (namely, the original allowed NSSAI), and the new allowed NSSAI is the same as the original allowed NSSAI.

Specifically, S906 is the same as S806, and details are not described again.

It should be noted that, in this embodiment shown in FIG. 9, the original allowed NSSAI is not empty, in other words, the original allowed NSSAI includes at least one piece of S-NSSAI.

S907: The AMF sends the first information and the new allowed NSSAI to an NSSF. Correspondingly, the NSSF receives the first information and the new allowed NSSAI, and determines the target NSSAI based on the first information and the new allowed NSSAI.

It should be understood that, because the NSSAA procedure for the pending NSSAI in S906 fails, the new allowed NSSAI is the same as the original allowed NSSAI, in other words, the allowed NSSAI determined before the NSSAA procedure is not updated, and the new allowed NSSAI in S907 may be understood as the original allowed NSSAI.

Specifically, the AMF may invoke a service-oriented operation of the NSSF: a service-oriented interface Nnssf_network slice selection_get (Nnssf_NSSelection-_Get) to send the first information and the original allowed NSSAI to the NSSF. Optionally, the AMF further sends, to the NSSF, indication information indicating the NSSF to determine the target NSSAI, so that the NSSF determines the target NSSAI in response to the indication information based on the first information and the original allowed NSSAI.

It should be understood that if the AMF stores the first information and the first indication information in S903, after the NSSAA procedures for all the pieces of S-NSSAI included in the pending NSSAI are completed, in response to the first indication information, the AMF may obtain the first information from the context of the UE, and send the first information and the new allowed NSSAI determined in S906 to the NSSF.

A process in which the NSSF determines the target NSSAI is the same as the process in which the AMF determines the target NSSAI. Details are not described again.

S908: The NSSF sends the target NSSAI to the AMF. Correspondingly, the AMF receives the target NSSAI.

Specifically, the NSSF invokes a service-oriented operation of the NSSF: a service-oriented interface Nnssf_network slice selection_get response (Nnssf_NSSelection_Get response) to return the target NSSAI to the AMF.

S909: The AMF sends the target NSSAI to a PCF. Correspondingly, the PCF receives the target NSSAI from the AMF.

Specifically, S909 is the same as S608, and details are not described again.

S910: The PCF determines, based on the target NSSAI, the RFSP index corresponding to the target NSSAI, and sends the RFSP index corresponding to the target NSSAI to the AMF. Correspondingly, the AMF receives the RFSP index corresponding to the target NSSAI from the PCF.

Specifically, S910 is the same as S609, and details are not described again.

Optionally, after obtaining the target NSSAI and the RFSP index corresponding to the target NSSAI, the AMF may delete the first information stored in the context of the UE. In addition, if the AMF further stores the first indication information in S903, the AMF may further delete the first indication information after obtaining the target NSSAI and the RFSP index corresponding to the target NSSAI.

Because the NSSAA on all the pieces of S-NSSAI in the pending NSSAI fails, the allowed NSSAI is not updated, and is the original allowed NSSAI. Because the original allowed NSSAI has been carried in the registration accept message to be sent to the UE, the AMF does not need to send the new allowed NSSAI to the UE using a UE configuration update procedure. Instead, the AMF initiates a UE context modification request to update an access frequency of the UE. Specifically, this process is described in S911.

S911: The AMF sends the UE context modification request to the RAN, where the UE context modification request carries second information {target NSSAI, the RFSP index corresponding to the target NSSAI}. Correspondingly, the RAN receives the UE context modification request from the AMF.

Specifically, S911 is the same as S810, and details are not described again.

S912: The RAN determines, based on the target NSSAI and the RFSP index corresponding to the target NSSAI, information about the access frequency corresponding to the target NSSAI, and sends the information about the access frequency corresponding to the target NSSAI to the UE. Correspondingly, the UE receives the information about the access frequency corresponding to the target NSSAI.

Specifically, S912 is the same as S612, and details are not described again.

S913: The UE selects a target cell based on the information about the access frequency corresponding to the target NSSAI, and initiates a registration update procedure to the target cell. For example, after the UE receives, from the RAN in S912, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request message may further include other information such as the identification information of the UE in addition to the requested NSSAI.

S914: The AMF triggers, based on the received registration request message, another network element to complete another procedure in a registration procedure, so that the UE accesses, at a current location, the network slice corresponding to the target NSSAI.

Specifically, for this process, refer to a conventional technology. Details are not described.

According to the method shown in FIG. 9, in a scenario in which the AMF determines that the TA in which the RAN is currently located does not support the S-NSSAI in the requested NSSAI, and determines that the requested NSSAI includes the S-NSSAI (for example, the pending NSSAI) on which the NSSAA needs to be performed, after the NSSAA procedure is performed on all the pieces of S-NSSAI included in the pending NSSAI and when the NSSAA on the S-NSSAI fails, the original allowed NSSAI is not updated, and the obtained new allowed NSSAI is the same as the original allowed NSSAI. The AMF obtains the target NSSAI from the NSSF based on the new allowed NSSAI (where the new allowed NSSAI may be understood as the original allowed NSSAI) and the first information (the requested NSSAI or the rejected NSSAI), obtains the RFSP index corresponding to the target NSSAI from the PCF, and sends the target NSSAI and the RFSP index corresponding to the target NSSAI to the RAN, to trigger the RAN to indicate the UE to select the new TA, where the new TA can support all the network slices corresponding to the target NSSAI, to ensure that the UE can successfully access the network slice in the scenario in which the requested NSSAI includes both the S-NSSAI not supported by the current TA and the S-NSSAI on which the NSSAA needs to be performed.

In the method shown in FIG. 8 or FIG. 9, with reference to the scenario in which the TA in which the RAN is currently located does not support the S-NSSAI in the requested NSSAI and the requested NSSAI includes the S-NSSAI (for example, the pending NSSAI) on which the NSSAA needs to be performed, the TA selection method provided in embodiments of this application is described by using an example in which the NSSAA on all the pieces of S-NSSAI included in the pending NSSAI fails and the original allowed NSSAI is not empty. The following describes a tracking area selection method performed when the NSSAA on all the pieces of S-NSSAI included in the pending NSSAI fails and the original allowed NSSAI is empty.

FIG. 10 shows still another tracking area selection method according to an embodiment of this application. In the method, an AMF determines target NSSAI. As shown in FIG. 10, the method may include the following steps.

S1001: UE sends a registration request message to the AMF through a currently accessed RAN. Correspondingly, the AMF receives the registration request message through the RAN that is currently accessed by the UE.

Specifically, related descriptions of the registration request message and an execution process of S1001 are the same as those in S601, and details are not described again.

S1002: The AMF determines S-NSSAI that is in the requested NSSAI and that is not supported by a TA in which the RAN is located, and determines S-NSSAI that is in the requested NSSAI and on which NSSAA needs to be performed. It should be noted that, in this embodiment shown in FIG. 10, original allowed NSSAI is empty, in other words, original allowed NSSAI includes no S-NSSAI.

Specifically, an execution process of S1002 is the same as that of S602, and details are not described again.

For example, it is assumed that the requested NSSAI includes S-NSSAI-1, S-NSSAI-2, and S-NSSAI-3, and the three pieces of S-NSSAI are included in the subscribed NSSAI of the UE. If the RAN currently accessed by the UE is in a TA 1, and the TA 1 supports the S-NSSAI-1, the rejected NSSAI includes the S-NSSAI-2 and the S-NSSAI-3. It can be learned from Table 3 that the NSSAA needs to be performed on the S-NSSAI-1 supported by the TA 1. In this case, the pending NSSAI includes the S-NSSAI-1, and the original allowed NSSAI is empty.

S1003: The AMF stores first information in a context of the UE.

Optionally, the AMF further stores first indication information in the context of the UE.

Specifically, related descriptions of the first indication information and an execution process of S1003 are the same as those in S603. Details are not described again.

S1004: The AMF sends a registration accept message to the UE through the RAN. Correspondingly, the UE receives the registration accept message from the AMF through the RAN.

Specifically, S1004 is the same as S604, and details are not described again. It should be understood that the original allowed NSSAI (or referred to as empty allowed NSSAI) included in the registration accept message in this embodiment shown in FIG. 10 is empty, and the registration accept message may or may not carry the original allowed NSSAI.

S1005: The AMF initiates the NSSAA procedure for each piece of S-NSSAI included in the pending NSSAI, and obtains a result of the NSSAA procedure for each piece of S-NSSAI.

Specifically, for an execution process of the NSSAA procedure, refer to a conventional technology. Details are not described.

S1006: If the results of the NSSAA procedures for all the pieces of S-NSSAI included in the pending NSSAI are that authentication and authorization fail, the AMF skips updating the original allowed NSSAI determined by the AMF in S1002. This means that allowed NSSAI (where the allowed NSSAI may be referred to as new allowed NSSAI) determined after the NSSAA procedure is empty, and does not include identification information of a network slice that the terminal is allowed to access.

Specifically, S1006 is the same as S606, and details are not described again.

For example, the example in S1002 is still used. The AMF initiates the NSSAA procedure for the S-NSSAI-1. If the NSSAA on the S-NSSAI-1 fails, the original allowed NSSAI is not updated, and the new allowed NSSAI determined after the NSSAA procedure is still empty.

S1007: The AMF determines the target NSSAI based on the first information and the new allowed NSSAI determined in S1006.

It should be understood that if the AMF stores the first information and the first indication information in S1003, after the NSSAA procedures for all the pieces of S-NSSAI included in the pending NSSAI are completed, in response to the first indication information, the AMF may obtain the first information from the context of the UE, and determine the target NSSAI based on the first information.

Specifically, for S1007, refer to S607. Because the NSSAA procedure for the pending NSSAI in S1006 fails, the new allowed NSSAI is empty, and S1007 may be understood as determining the target NSSAI based on the first information.

S1008: The AMF sends the target NSSAI to the PCF. Correspondingly, the PCF receives the target NSSAI from the AMF.

Specifically, S1008 is the same as S608, and details are not described again.

S1009: The PCF determines, based on the target NSSAI, the RFSP index corresponding to the target NSSAI, and sends the RFSP index corresponding to the target NSSAI to the AMF. Correspondingly, the AMF receives the RFSP index corresponding to the target NSSAI from the PCF.

Specifically, S1009 is the same as S609, and details are not described again.

Optionally, after determining the target NSSAI and obtaining the RFSP index corresponding to the target NSSAI, the AMF may delete the first information stored in the context of the UE. In addition, if the AMF further stores the first indication information in S1003, the AMF may further delete the first indication information after determining the target NSSAI and obtaining the RFSP index corresponding to the target NSSAI.

Because the NSSAA on all the pieces of S-NSSAI in the pending NSSAI fails, the allowed NSSAI is not updated, and is empty. As a result, this registration fails. The AMF is triggered to initiate a deregistration procedure, release the context of the UE in the RAN, and indicate information about the access frequency corresponding to the target network slice to the UE in a UE context release procedure, so that the UE accesses the target network slice through a new TA/cell. Specifically, this process is described in S1010 and S1011.

S1010: The AMF initiates the deregistration procedure to the UE through the RAN. For example, the AMF sends a deregistration request to the UE through the RAN, to trigger the UE to perform deregistration/cancel the current network registration.

S1011: The AMF sends a UE context release request to the RAN, where the UE context release request carries second information {target NSSAI, the RFSP index corresponding to the target NSSAI}. Correspondingly, the RAN receives the UE context release request from the AMF.

The UE context release request may request to release the context of the UE stored in the RAN. The UE context release request may further carry the identification information of the UE and other information in addition to the second information. This is not limited.

S1012: The RAN determines, based on the target NSSAI and the RFSP index corresponding to the target NSSAI, the information about the access frequency corresponding to the target NSSAI, and sends the information about the access frequency corresponding to the target NSSAI to the UE. Correspondingly, the UE receives the information about the access frequency corresponding to the target NSSAI.

Specifically, S1011 is the same as S612, and details are not described again.

S1013: The UE selects a target cell based on the information about the access frequency corresponding to the target NSSAI, and initiates a registration update procedure to the target cell. For example, after the UE receives, from the RAN in S1012, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request
message may further include other information such as the
identification information of the UE in addition to the
requested NSSAI.

S1014: The AMF triggers, based on the received regis-
tration request message, another network element to com-
plete another procedure in a registration procedure, so that
the UE accesses, at a current location, the network slice
corresponding to the target NSSAI.

Specifically, for this process, refer to a conventional
technology. Details are not described.

According to the method in FIG. 10, in a scenario in
which the AMF determines that the TA in which the RAN is
currently located does not support the S-NSSAI in the
requested NSSAI, and determines that the requested NSSAI
includes the S-NSSAI (for example, the pending NSSAI) on
which the NSSAA needs to be performed, if the NSSAA on
all the pieces of S-NSSAI included in the pending NSSAI
fails, and the allowed NSSAI is empty, the AMF is triggered
to initiate the deregistration procedure, determine the target
NSSAI based on the first information (the requested NSSAI
or the rejected NSSAI) and the empty allowed NSSAI,
obtain the RFSP index corresponding to the target NSSAI
from the PCF, and send the target NSSAI and the RFSP
index corresponding to the target NSSAI to the RAN, to
trigger the RAN to indicate the UE to select the new TA/new
cell for access, where the new TA/cell can support all the
network slices corresponding to the target NSSAI, to ensure
that the UE can successfully access the network slice in the
scenario in which the requested NSSAI includes both the
S-NSSAI not supported by the current TA and the S-NSSAI
on which the NSSAA needs to be performed.

The process in which when the NSSAA on all the pieces
of S-NSSAI included in the pending NSSAI fails and the
allowed NSSAI is empty, the AMF determines the target
NSSAI and interacts with the PCF to obtain the RFSP index
corresponding to the target NSSAI is described in the
method in FIG. 10. Alternatively, another network element
may determine the target NSSAI, interact with the PCF to
obtain the RFSP index corresponding to the target NSSAI,
and send the target NSSAI and the RFSP index correspond-
ing to the target NSSAI to the AMF. Specifically, for this
method, refer to descriptions in FIG. 11A and FIG. 11B.

FIG. 11A and FIG. 11B show still another tracking area
selection method according to an embodiment of this appli-
cation. In the method, an NSSF determines target NSSAI. As
shown in FIG. 11A and FIG. 11B, the method may include
the following steps.

S1101: UE sends a registration request message to an
AMF through a currently accessed RAN. Correspondingly,
the AMF receives the registration request message through
the RAN that is currently accessed by the UE.

Specifically, related descriptions of the registration
request message and an execution process of S1101 are the
same as those in S601, and details are not described again.

S1102: The AMF determines S-NSSAI that is in the
requested NSSAI and that is not supported by a TA in which
the RAN is located, and determines S-NSSAI that is in the
requested NSSAI and on which NSSAA needs to be per-
formed. It should be noted that, in this embodiment shown
in FIG. 11A and FIG. 11B, original allowed NSSAI is empty,
in other words, original allowed NSSAI includes no S-NS-
SAI.

Specifically, an execution process of S1102 is the same as
that of S1002, and details are not described again.

S1103: The AMF stores first information in a context of
the UE.

Optionally, the AMF further stores first indication infor-
mation in the context of the UE.

Specifically, related descriptions of the first indication
information and an execution process of S1103 are the same
as those in S603. Details are not described again.

S1104: The AMF sends a registration accept message to
the UE through the RAN. Correspondingly, the UE receives
the registration accept message from the AMF through the
RAN.

Specifically. S1104 is the same as S604, and details are
not described again. It should be understood that the original
allowed NSSAI (or referred to as empty allowed NSSAI)
included in the registration accept message in this embodi-
ment shown in FIG. 11A and FIG. 11B is empty, and the
registration accept message may or may not carry the
original allowed NSSAI.

S1105: The AMF initiates the NSSAA procedure for each
piece of S-NSSAI included in the pending NSSAI, and
obtains a result of the NSSAA procedure for each piece of
S-NSSAI.

Specifically, for an execution process of the NSSAA
procedure, refer to a conventional technology. Details are
not described.

S1106: If the results of the NSSAA procedures for all the
pieces of S-NSSAI included in the pending NSSAI are that
authentication and authorization fail, the AMF skips updat-
ing the original allowed NSSAI determined by the AMF in
S1102. This means that allowed NSSAI (where the allowed
NSSAI may be referred to as new allowed NSSAI) deter-
mined after the NSSAA procedure is empty, and does not
include identification information of a network slice that the
terminal is allowed to access.

Specifically. S1106 is the same as S1006, and details are
not described again.

S1107: The AMF sends the first information and the new
allowed NSSAI determined in S1006 to an NSSF. Corre-
spondingly, the NSSF receives the first information and the
new allowed NSSAI determined in S1006, and determines
the target NSSAI based on the first information and the new
allowed NSSAI determined in S1006.

It should be understood that, because the NSSAA proce-
dure for the pending NSSAI in S1106 fails, the new allowed
NSSAI is empty, and S1107 may be understood as that the
AMF sends the first information to the NSSF. Correspond-
ingly, the NSSF receives the first information, and deter-
mines the target NSSAI based on the first information.

Specifically, the AMF may invoke a service-oriented
operation of the NSSF: a service-oriented interface
Nnssf_network slice selection_get (Nnssf_NSSelection-
_Get) to send the first information and the new allowed
NSSAI determined in S1006 to the NSSF. Optionally, the
AMF further sends, to the NSSF, indication information
indicating the NSSF to determine the target NSSAI, so that
the NSSF determines the target NSSAI in response to the
indication information based on the first information and the
new allowed NSSAI determined S1006.

It should be understood that if the AMF stores the first
information and the first indication information in S1103,
after the NSSAA procedures for all the pieces of S-NSSAI
included in the pending NSSAI are completed, in response
to the first indication information, the AMF may obtain the
first information from the context of the UE, and send the
first information and the new allowed NSSAI determined in
S1006 to the NSSF, so that the NSSF determines the target
NSSAI based on the first information and the new allowed
NSSAI determined in S1006.

A process in which the NSSF determines the target NSSAI is the same as the process in which the AMF determines the target NSSAI. Details are not described again.

S1108: The NSSF sends the target NSSAI to the AMF. Correspondingly, the AMF receives the target NSSAI.

Specifically, the NSSF invokes a service-oriented operation of the NSSF: a service-oriented interface Nnssf_network slice selection_get response (Nnssf_NSSelection_Get response) to return the target NSSAI to the AMF.

S1109: The AMF sends the target NSSAI to a PCF. Correspondingly, the PCF receives the target NSSAI from the AMF.

Specifically, S1109 is the same as S608, and details are not described again.

S1110: The PCF determines, based on the target NSSAI, an RFSP index corresponding to the target NSSAI, and sends the RFSP index corresponding to the target NSSAI to the AMF. Correspondingly, the AMF receives the RFSP index corresponding to the target NSSAI from the PCF.

Specifically, S1110 is the same as S609, and details are not described again.

Optionally, after obtaining the target NSSAI and the RFSP index corresponding to the target NSSAI, the AMF may delete the first information stored in the context of the UE. In addition, if the AMF further stores the first indication information in S1003, the AMF may further delete the first indication information after obtaining the target NSSAI and the RFSP index corresponding to the target NSSAI.

Because the NSSAA on all the pieces of S-NSSAI in the pending NSSAI fails, and the allowed NSSAI is empty, this registration fails. The AMF is triggered to initiate a deregistration procedure, release the context of the UE in the RAN, and indicate information about an access frequency corresponding to a target network slice to the UE in a UE context release procedure, so that the UE accesses the target network slice through a new TA/cell. Specifically, this process is described in S1111 and S1112.

S1111: The AMF initiates the deregistration procedure to the UE through the RAN. For example, the AMF sends a deregistration request to the UE through the RAN, to trigger the UE to perform deregistration/cancel the current network registration.

S1112: Send a UE context release request to the RAN, where the UE context release request carries second information {target NSSAI. RFSP index corresponding to the target NSSAI}. Correspondingly, the RAN receives the UE context release request from the AMF.

The UE context release request may request to release the context of the UE stored in the RAN. The UE context release request may further carry the identification information of the UE and other information in addition to the second information. This is not limited.

S1113: The RAN determines, based on the target NSSAI and the RFSP index corresponding to the target NSSAI, the information about the access frequency corresponding to the target NSSAI, and sends the information about the access frequency corresponding to the target NSSAI to the UE. Correspondingly, the UE receives the information about the access frequency corresponding to the target NSSAI.

Specifically. S1113 is the same as S612, and details are not described again.

S1114: The UE selects a target cell based on the information about the access frequency corresponding to the target NSSAI, and initiates a registration update procedure to the target cell. For example, after the UE receives, from the RAN in S1113, the information about the access frequency corresponding to the target NSSAI, the UE selects and camps on a cell that supports the access frequency, and sends, to the AMF through the cell, a registration request message carrying the requested NSSAI. In this case, the requested NSSAI may be the target NSSAI. Correspondingly, the AMF receives the registration request message from the UE.

It should be understood that the registration request message may further include other information such as the identification information of the UE in addition to the requested NSSAI.

S1115: The AMF triggers, based on the received registration request message, another network element to complete another procedure in a registration procedure, so that the UE accesses, at a current location, the network slice corresponding to the target NSSAI.

Specifically, for this process, refer to a conventional technology. Details are not described.

According to the method in FIG. 11A and FIG. 11B, in a scenario in which the AMF determines that the TA in which the RAN is currently located does not support the S-NSSAI in the requested NSSAI, and determines that the requested NSSAI includes the S-NSSAI (for example, the pending NSSAI) on which the NSSAA needs to be performed, if the NSSAA on all the pieces of S-NSSAI included in the pending NSSAI fails, and the allowed NSSAI is empty, the AMF is triggered to initiate the deregistration procedure, obtain the target NSSAI from the NSSF, obtain the RFSP index corresponding to the target NSSAI from the PCF, and send the target NSSAI and the RFSP index corresponding to the target NSSAI to the RAN, to trigger the RAN to indicate the UE to select the new TA/new cell for access, where the new TA/cell can support all the network slices corresponding to the target NSSAI, to ensure that the UE can successfully access the network slice in the scenario in which the requested NSSAI includes both the S-NSSAI not supported by the current TA and the S-NSSAI on which the NSSAA needs to be performed.

It may be understood that, in the foregoing embodiments, the methods and/or steps implemented by the mobility management network element may alternatively be implemented by a component (for example, a chip or a circuit) that may be used in the mobility management network element.

The foregoing mainly describes, from a perspective of interaction between network elements, the solutions provided in embodiments of this application. Correspondingly, embodiments of this application further provide a communication apparatus. The communication apparatus may be the mobility management network element in the foregoing embodiments, an apparatus including the mobility management network element, or a component that may be used in the mobility management network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
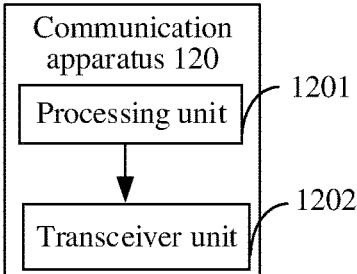
FIG. 12 is a schematic diagram of a structure of a communication apparatus 120 according to an embodiment of this application.

For example, the communication apparatus is the mobility management network element in the foregoing method embodiments. FIG. 12 is a schematic diagram of a structure of a communication apparatus 120. The communication apparatus 120 may be the mobility management network element or a module or a chip system configured to implement functions of the mobility management network element in the foregoing method embodiments. As shown in FIG. 12, the communication apparatus 120 may include a processing unit 1201 and a transceiver unit 1202. The transceiver unit 1202 is configured to implement a transceiver function, and for example, may be a transceiver circuit, a transceiver, or a communication interface.

The processing unit 1201 is configured to: obtain, from identification information of a network slice requested by a terminal, identification information of a network slice on which authentication and authorization are to be performed; initiate an authentication and authorization procedure for the network slice on which authentication and authorization are to be performed; determine, based on a result of the authentication and authorization procedure for the network slice, identification information of a network slice that the terminal is allowed to access; and obtain second information based on first information and the identification information of the network slice that the terminal is allowed to access, where the first information includes identification information of a network slice that the terminal is rejected to access or the identification information of the network slice requested by the terminal, and the network slice that the terminal is rejected to access is a network slice that is not supported by a TA in which an access network device is located and that is in the network slice requested by the terminal.

The transceiver unit 1202 is configured to send the second information to the access network device. The second information includes identification information of a target network slice and radio resource information corresponding to the target network slice.

In a possible design, the processing unit 1201 is specifically configured to determine the second information based on the first information and the identification information of the network slice that the terminal is allowed to access. Alternatively, the processing unit 1201 is specifically configured to: send, to a network slice selection function network element using the transceiver unit 1202, the first information and the identification information of the network slice that the terminal is allowed to access, and receive the second information from the network slice selection function network element using the transceiver unit 1202.

In a possible design, the transceiver unit 1202 is specifically configured to: if the authentication and authorization procedure for the network slice on which authentication and authorization are to be performed succeeds, initiate a user equipment (UE) configuration update procedure, and send, to the access network device, a first message including a configuration update command and the first information. In other words, in a scenario in which the authentication and authorization succeed, the second information is sent to the access network device through the configuration update procedure, to reduce signaling overheads. If the authentication and authorization procedure for the network slice on which authentication and authorization are to be performed is unsuccessful, and the identification information of the network slice that the terminal is allowed to access is not empty, the transceiver unit 1202 is specifically configured to send a UE context modification request carrying the second information to the access network device. If the authentication and authorization procedure for the network slice on which authentication and authorization are to be performed is unsuccessful, and the identification information of the network slice that the terminal is allowed to access is empty, the transceiver unit 1202 is specifically configured to send a UE context release request carrying the second information to the access network device.

All related content of the steps in the foregoing method embodiments shown in FIG. 5 to FIG. 11B may be referenced to function descriptions of corresponding function modules. Details are not described herein again.

In this embodiment, the communication apparatus 120 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 120 may be in a form of the communication apparatus 400 shown in FIG. 4.

For example, the processor 401 in the communication apparatus 400 shown in FIG. 4 may invoke the computer-executable instructions stored in the memory 403, so that the communication apparatus 400 performs the tracking area selection method in the foregoing method embodiments.

Specifically, functions/implementation processes of the transceiver unit 1202 and the processing unit 1201 in FIG. 12 may be implemented by the processor 401 in the communication apparatus 400 shown in FIG. 4 by invoking the computer-executable instructions stored in the memory 403. Alternatively, a function/an implementation process of the processing unit 1201 in FIG. 12 may be implemented by the processor 401 in the communication apparatus 400 shown in FIG. 4 by invoking the computer-executable instructions stored in the memory 403, and a function/an implementation process of the transceiver unit 1202 in FIG. 12 may be implemented by the communication interface 404 in the communication apparatus 400 shown in FIG. 4.

Because the communication apparatus 120 provided in this embodiment can perform the foregoing tracking area selection method, for technical effects that can be achieved by the communication apparatus 120, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built in a SoC (system-on-a-chip) or an ASIC, or may be an independent semiconductor chip. In addition to a core configured to perform an operation or processing by executing software instructions, the processor may further include a necessary hardware accelerator, for example, a field programmable gate array (FPGA), a PLD (programmable logic device), or a logic circuit that implements a dedicated logic operation. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor. The steps of the methods disclosed with reference to embodiments of this application may be directly performed by a hardware processor, or may be performed by a combination of hardware in the processor and a software module.

In embodiments of this application, the memory may be a non-volatile memory, for example, a hard disk drive (HDD) or a solid-state drive (SSD); or may be a volatile memory, for example, a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store instructions and/or data.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or perform the foregoing method procedures not by relying on software.

Optionally, an embodiment of this application further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may alternatively not be included in the communication apparatus. When the communication apparatus is a chip system, the chip system may include a chip, or may include a chip and another discrete component. This is not specifically limited in embodiments of this application.

Figure 13:
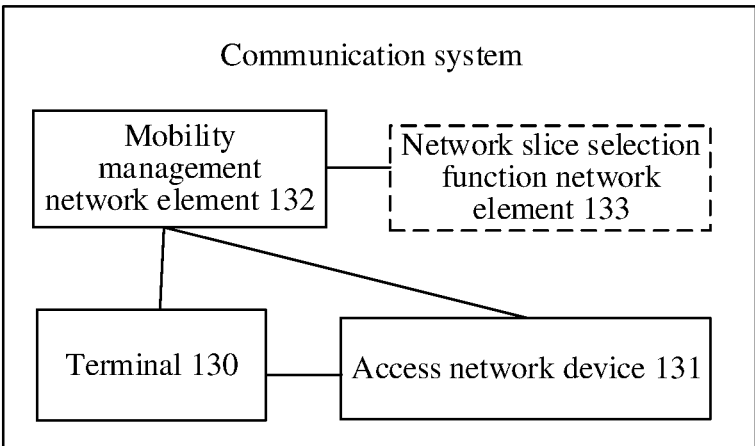
FIG. 13 is a schematic diagram of a structure of a communication system according to an embodiment of this application.

Optionally, an embodiment of this application further provides a communication system. FIG. 13 is a structural diagram of the communication system. The communication system may include a terminal 130, an access network device 131, and a mobility management network element 132, and may further include a network slice selection function network element 133. It should be noted that FIG. 13 is merely an example accompanying drawing, and network elements included in the communication system shown in FIG. 13 and a quantity of network elements are not limited in this embodiment of this application.

The mobility management network element 132 has functions of the mobility management network element in the one or more methods shown in FIG. 5 to FIG. 11B. The access network device 131 has functions of a first session management network element in the one or more methods shown in FIG. 5 to FIG. 11B. The network slice selection function network element 133 has functions of the NSSF in the one or more methods shown in FIG. 5 to FIG. 11B. Details are not described herein again.

All or some of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of disclosed embodiments by viewing the accompanying drawings, disclosed content, and appended claims. In the claims, "comprising" does not exclude another component or another step, and "a" or "one" does not exclude a case of "multiple". A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example descriptions of this application defined by the appended claims, and are considered as covering any of or all modifications, variations, combinations or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A tracking area selection method comprising:

obtaining, by a mobility management network element, from identification information of a network slice requested by a terminal, identification information of a network slice on which authentication and authorization are to be performed;

initiating, by the mobility management network element, an authentication and authorization procedure for the network slice on which authentication and authorization are to be performed;

determining, by the mobility management network element, based on a result of the authentication and authorization procedure for the network slice, identification information of a network slice that the terminal is allowed to access;

obtaining, by the mobility management network element, second information based on first information and the identification information of the network slice that the terminal is allowed to access, wherein the first information comprises identification information of a network slice that the terminal is rejected to access or the identification information of the network slice requested by the terminal, the network slice that the terminal is rejected to access is a network slice that is not supported by a tracking area in which an access network device is located and that is in the network slice requested by the terminal, and the second information comprises identification information of a target network slice and radio resource information corresponding to the target network slice; and sending, by the mobility management network element, the second information to the access network device.

2. The method according to claim 1, wherein the obtaining, by the mobility management network element, the second information based on the first information and the identification information of the network slice that the terminal is allowed to access comprises:

determining, by the mobility management network element, the second information based on the first information and the identification information of the network slice that the terminal is allowed to access.

3. The method according to claim 2, wherein the determining, by the mobility management network element, the second information based on the first information and the identification information of the network slice that the terminal is allowed to access comprises:

determining, by the mobility management network element, based on the first information, the identification information of the network slice that the terminal is rejected to access; and determining, by the mobility management network element, the identification information of the target network slice based on the identification information of the network slice that the terminal is rejected to access and the identification information of the network slice that the terminal is allowed to access.

4. The method according to claim 1, wherein the obtaining, by the mobility management network element, the second information based on the first information and the identification information of the network slice that the terminal is allowed to access comprises:

sending, by the mobility management network element to a network slice selection function network element, the first information and the identification information of the network slice that the terminal is allowed to access, and receiving the second information from the network slice selection function network element.

5. The method according to claim 1, wherein the sending, by the mobility management network element, the second information to the access network device comprises:

sending, by the mobility management network element, the second information to the access network device after a registration procedure for the terminal.

6. The method according to claim 5, wherein the sending, by the mobility management network element, the second information to the access network device comprises:

based on the authentication and authorization procedure for the network slice on which authentication and authorization are to be performed being successful, initiating, by the mobility management network element, a user equipment (UE) configuration update procedure, and sending a first message to the access network device, wherein the first message comprises a UE configuration update command and the second information.

7. The method according to claim 5, wherein the sending, by the mobility management network element, the second information to the access network device comprises:

sending, by the mobility management network element, a UE context modification request to the access network device if based on the authentication and authorization procedure for the network slice on which authentication and authorization are to be performed being unsuccessful and the identification information of the network slice that the terminal is allowed to access being not empty, wherein the UE context modification request comprises the second information.

8. The method according to claim 5, wherein the sending, by the mobility management network element, the second information to the access network device comprises:

sending, by the mobility management network element, a UE context release request to the access network device based on the authentication and authorization procedure for the network slice on which authentication and authorization are to be performed being unsuccessful and the identification information of the network slice that the terminal is allowed to access being empty, wherein the UE context release request comprises the second information.

9. The method according to claim 1, further comprising:
storing, by the mobility management network element, the first information.

10. The method according to claim 1, further comprising:
storing, by the mobility management network element, first indication information, wherein the first indication information indicates to perform one or more of the following:

selecting a new tracking area for the terminal, wherein the new tracking area supports the target network slice;

redirecting the terminal to a tracking area or a frequency band that supports the target network slice; or obtaining the second information after the authentication and authorization procedure; and wherein the obtaining, by the mobility management network element, the second information based on the first information and the identification information of the network slice that the terminal is allowed to access comprises:

obtaining, by the mobility management network element in response to the first indication information, the second information based on the first information and the identification information of the network slice that the terminal is allowed to access.

11. A communication apparatus comprising:
a processor, configured to: obtain, from identification information of a network slice requested by a terminal, identification information of a network slice on which authentication and authorization are to be performed; and initiate an authentication and authorization procedure for the network slice on which authentication and authorization are to be performed, wherein the processor is further configured to: determine, based on a result of the authentication and authorization procedure for the network slice, identification information of a network slice that the terminal is allowed to access; and obtain second information based on first information and the identification information of the network slice that the terminal is allowed to access, wherein the first information comprises identification information of a network slice that the terminal is rejected to access or the identification information of the network slice requested by the terminal, the network slice that the terminal is rejected to access is a network slice that is not supported by a tracking area in which an access network device is located and that is in the network slice requested by the terminal, and the second information comprises identification information of a target network slice and radio resource information corresponding to the target network slice; and a transceiver, configured to cooperate with the processor to send the second information to the access network device.

12. The communication apparatus according to claim 11, wherein the processor is further configured to:

determine the second information based on the first information and the identification information of the network slice that the terminal is allowed to access.

13. The communication apparatus according to claim 12, wherein the processor is further configured to:

determine, based on the first information, the identification information of the network slice that the terminal is rejected to access; and determine the identification information of the target network slice based on the identification information of the network slice that the terminal is rejected to access and the identification information of the network slice that the terminal is allowed to access.

14. The communication apparatus according to claim 11, wherein the processor is further configured to:

send, to a network slice selection function network element using the transceiver, the first information and the identification information of the network slice that the terminal is allowed to access; and receive, using the transceiver, the second information from the network slice selection function network element.

15. The communication apparatus according to claim 13, wherein the transceiver is further configured to cooperate with the processor to:

send the second information to the access network device after a registration procedure for the terminal.

16. The communication apparatus according to claim 15, wherein the transceiver is further configured to cooperate with the processor to:

based on the authentication and authorization procedure for the network slice on which authentication and authorization are to be performed being successful, initiate a user equipment (UE) configuration update procedure, and send a first message to the access network device, wherein the first message comprises a UE configuration update command and the second information.

17. The communication apparatus according to claim 15, wherein the transceiver is further configured to cooperate with the processor to:

send a UE context modification request to the access network device based on the authentication and authorization procedure for the network slice on which authentication and authorization are to be performed being unsuccessful and the identification information of the network slice that the terminal is allowed to access being not empty, wherein the UE context modification request comprises the second information.

18. The communication apparatus according to claim 15, wherein the transceiver is further configured to cooperate with the processor to:

send a UE context release request to the access network device based on the authentication and authorization procedure for the network slice on which authentication and authorization are to be performed being unsuccessful and the identification information of the network slice that the terminal is allowed to access being empty, wherein the UE context release request comprises the second information.

19. The communication apparatus according to claim 11, wherein the processor is further configured to:

store the first information.

20. The communication apparatus according to claim 11, wherein the processor is further configured to:

store first indication information, wherein the first indication information indicates to perform one or more of the following:

selecting a new tracking area for the terminal, wherein the new tracking area supports the target network slice;

redirecting the terminal to a tracking area or a frequency band that supports the target network slice; or obtaining the second information after the authentication and authorization procedure; and the processor is further configured to obtain, for a mobility management network element in response to the first indication information, the second information based on the first information and the identification information of the network slice that the terminal is allowed to access.

* * * * *